US012784099B2

(12) United States Patent
Shepherd et al.

(10) Patent No.: US 12,784,099 B2
(45) Date of Patent: Nov. 3, 2026

(54) SYSTEMS AND METHODS FOR EXCHANGE PROTECTION USING CONTROLLING FRAMEWORK

(71) Applicant: Wells Fargo Bank, N.A., San Francisco, CA (US)

(72) Inventors: Matthew Mullin Shepherd, Charlotte, NC (US); Nathaniel C. Eutsler, San Francisco, CA (US); Daniel G. Vogt, New York, NY (US); Piers Varley, San Francisco, CA (US); Oleg Terletsky, San Francisco, CA (US); Oleg Grinshpun, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/749,500

(22) Filed: Jun. 20, 2024

(65) Prior Publication Data

US 2025/0390947 A1 Dec. 25, 2025

(51) Int. Cl.
*G06Q 40/04* (2012.01)
*G06Q 20/10* (2012.01)
(Continued)

(52) U.S. Cl.
CPC ........... *G06Q 40/04* (2013.01); *G06Q 40/024* (2025.08); *G06Q 40/032* (2025.08);
(Continued)

(58) Field of Classification Search
CPC .... G06Q 40/04; G06Q 40/024; G06Q 40/032; G06Q 20/3678; G06Q 20/3825; G06Q 20/4016
(Continued)

(56) References Cited

U.S. PATENT DOCUMENTS

2019/0028276 A1* 1/2019 Pierce .................. G06Q 20/401
2019/0377724 A1* 12/2019 Pennington ............ G06Q 20/02
2020/0250633 A1* 8/2020 Vinson ............... G06Q 20/3676

OTHER PUBLICATIONS

What We Investigate, Federal Bureau of Investigation, Jun. 5, 2024, 9 pages retrieved from the Internet Archive from a scrape of https://www.fbi.gov/investigate/white-collar-crime/asset-forfeiture/ (Year: 2024).*

(Continued)

*Primary Examiner* — James D Nigh
(74) *Attorney, Agent, or Firm* — Foley & Lardner LLP

(57) ABSTRACT

Various examples, systems and methods are disclosed relating modeling exchanges. One system is a data processing system including memory and processing circuits configured to maintain an operating account data structure including a plurality of funds of a recipient provider. The processing circuits further configured to receive, from a sender provider computing system, a signed exchange package for an exchange of funds. The processing circuits further configured to model the signed exchange package using a first controlling framework to generate an exchange flag, the exchange flag is generated based on a detection of a discrepancy. The processing circuits further configured to freeze the funds by routing the signed exchange package from the operating account data structure to an escrow wallet. The processing circuits further configured to monitor the funds within the escrow wallet. The processing circuits further configured to process a controlled release of the funds.

18 Claims, 5 Drawing Sheets

(51) Int. Cl.
*G06Q 20/36* (2012.01)
*G06Q 20/38* (2012.01)
*G06Q 20/40* (2012.01)
*G06Q 40/02* (2023.01)
*G06Q 40/03* (2023.01)

(52) U.S. Cl.
CPC ..... *G06Q 20/3678* (2013.01); *G06Q 20/3825* (2013.01); *G06Q 20/4016* (2013.01)

(58) Field of Classification Search
USPC .......................................................... 705/75
See application file for complete search history.

(56) References Cited

OTHER PUBLICATIONS

• Dwivedi et al. "Cross-Chain Atomic Swaps without Time Locks", IEEE, 2023 Fifth International Conference on Blockchain Computing and Applications (BCCA), Dec. 5, 2023, pp. 606-614 (Year: 2023).*
BSA/AML Manual, FFIEC BSA/AML Infobase, retrieved from https://web.archive.org/web/20240614162406/https://bsaaml.ffiec.gov/manual/OfficeOfForeignAssetsControl/01, scraped on Jun. 14, 2024, 12 pages (Year: 2024).*

* cited by examiner

SYSTEMS AND METHODS FOR EXCHANGE PROTECTION USING CONTROLLING FRAMEWORK

TECHNICAL FIELD

The present implementations relate generally to exchanges, and more particularly to protecting cross-jurisdiction exchanges. Additionally, the present implementations relate generally to the integration of data retrieve and data modeling.

BACKGROUND

In a networked environment such as the internet, users and entities such as individuals, financial institutions, and multinational corporations engage in frequent exchanges. These exchanges can represent a variety of financial operations, including investments, payments, and financial securities trading. As the volume of global exchange continues to increase and the demand for expediated processing rises, modifying the regulatory framework for verifying these exchanges may be important.

BRIEF SUMMARY

Some implementations relate to a method of modeling exchanges. The method including maintaining, by one or more processing circuits, an operating account data structure including a plurality of funds of a recipient provider. Maintaining the operating account data structure can include storing the plurality of funds under a first controlling framework corresponding with a first set of controlling parameters. The method further including receiving, by the one or more processing circuits from a sender provider computing system, a signed exchange package for an exchange of funds between a sender of a sender provider and a recipient of the recipient provider. The signed exchange package can be signed based on satisfying a second set of controlling parameters of a second controlling framework of the sender provider. The method further including storing, by the one or more processing circuits, the signed exchange package including the funds of the signed exchange package into the operating account data structure. The method further including modeling, by the one or more processing circuits, the signed exchange package using the first controlling framework to generate an exchange flag. The first set of controlling parameters of the first controlling framework can be accessed from one or more data feeds of a plurality of access locations. The exchange flag can be generated based on a detection of a discrepancy in the signed exchange package or a regulatory restriction. The method further including embedding, by the one or more processing circuits, the exchange flag into the signed exchange package. The method further including freezing, by the one or more processing circuits, the funds by routing the signed exchange package including the funds and the exchange flag from the operating account data structure to an escrow wallet of an escrow wallet system of the recipient provider. The method further including monitoring, by the one or more processing circuits, the funds within the escrow wallet based on receiving or accessing additional data from at least one of the one or more data feeds of the plurality of access locations or the sender provider computing system. The method further including processing, by the one or more processing circuits, a controlled release of the funds from the escrow wallet to a wallet system of the recipient, to the sender provider computing system, or a central provider system. The controlled release to the wallet system can be based on satisfying the discrepancy in the signed exchange package or the regulatory restriction. The controlled release to the sender provider computing system or the central provider system can be based on a time period of the funds being in the escrow wallet or failing to satisfy the discrepancy in the signed exchange package or the regulatory restriction.

In some implementations, the first controlling framework and the second controlling framework are jurisdiction-specific, the first controlling framework corresponding to a first jurisdiction and the second controlling framework corresponding to a second jurisdiction, and the first set of controlling parameters of the first controlling framework includes at least one controlling parameter different from the second set of controlling parameters of the second controlling framework.

In some implementations, the signed exchange package is signed using digital signature authenticated using a cryptographic method, and the signed exchange package is further signed based on satisfying a third set of controlling parameters of a central provider of the second jurisdiction, and the escrow wallet system freezes the plurality of funds by restricting exchanges using exchange security restrictions preventing fund disbursement, and the operating account data structure is an exchange ledger that stores funds designated for processing, the operating account data structure maintains a record of deposits, withdrawals, and exchanges.

In some implementations, processing the controlled release of the funds to the central provider system corresponds to a forfeiture of the funds to a government entity regulating the recipient provider, and processing the controlled release of the funds to the sender provider computing system corresponds to a return of the funds to the sender provider.

In some implementations, the modeling includes executing one or more smart contracts including executable code to verify compliance of the exchange of funds with the first controlling framework, and the one or more smart contracts automatically generates the exchange flag, embeds the exchange flag into the signed exchange package, and freezes the funds by routing the signed exchange package to the escrow wallet.

In some implementations, the one or more processing circuits are nodes of a distributed ledger, the one or more processing circuits store the one or more smart contracts on the distributed ledger and execute the one or more smart contracts by verifying compliance with the first controlling framework, updating a compliance status or a compliance result on the distributed ledger.

In some implementations, the escrow wallet system includes a plurality of escrow accounts, and routing the signed exchange package to the escrow wallet is further based on a type of exchange flag of a plurality of types of exchange flags, the plurality of types of exchange flags include terrorism detection, non-compliant exchange detection, regulatory detection, or office of foreign assets control (OFAC) detection.

In some implementations, the method further including generating, by the one or more processing circuits, a compliance report including information supporting one or more reasons for routing of the funds to the escrow wallet and generating and presenting, by the one or more processing circuits, a graphical user interface (GUI) dashboard includes real-time information regarding a compliance status of the exchange of funds, a location of the funds, and the discrepancy in the signed exchange package or the regulatory restriction.

In some implementations, the method further including in response to processing the controlled release, determining, by the one or more processing circuits, an interest amount based on a duration the funds were frozen in the escrow wallet and processing, by the one or more processing, one or more interest payments to at least one of the sender provider, the recipient provider, the sender, or the recipient.

In some implementations, the method further including determining, by the one or more processing circuits, a first access location of the plurality of access locations of the one or more data feeds corresponding to primary regulatory data sources, determining, by the one or more processing circuits, a second access location of the plurality of access locations of the one or more data feeds corresponding to secondary regulatory data sources, the primary regulatory data sources include jurisdiction-specific data, and the secondary regulatory data sources include jurisdiction-agnostic data, and updating, by the one or more processing circuits, the first controlling framework based on receiving or accessing the additional data from the first access location or the second access location.

Some implementations relate to a system, including an data processing system including memory and one or more processing circuits configured to maintain an operating account data structure including a plurality of funds of a recipient provider, maintaining the operating account data structure includes storing the plurality of funds under a first controlling framework corresponding with a first set of controlling parameters. The one or more processing circuits further configured to receive, from a sender provider computing system, a signed exchange package for an exchange of funds between a sender of a sender provider and a recipient of the recipient provider, the signed exchange package is signed based on satisfying a second set of controlling parameters of a second controlling framework of the sender provider. The one or more processing circuits further configured to store the signed exchange package including the funds of the signed exchange package into the operating account data structure. The one or more processing circuits further configured to model the signed exchange package using the first controlling framework to generate an exchange flag, the first set of controlling parameters of the first controlling framework are accessed from one or more data feeds of a plurality of access locations, the exchange flag is generated based on a detection of a discrepancy in the signed exchange package or a regulatory restriction. The one or more processing circuits further configured to embed the exchange flag into the signed exchange package. The one or more processing circuits further configured to freeze the funds by routing the signed exchange package including the funds and the exchange flag from the operating account data structure to an escrow wallet of an escrow wallet system of the recipient provider. The one or more processing circuits further configured to monitor the funds within the escrow wallet based on receiving or accessing additional data from at least one of the one or more data feeds of the plurality of access locations or the sender provider computing system. The one or more processing circuits further configured to process a controlled release of the funds from the escrow wallet to a wallet system of the recipient, to the sender provider computing system, or a central provider system, the controlled release to the wallet system is based on satisfying the discrepancy in the signed exchange package or the regulatory restriction, and the controlled release to the sender provider computing system or the central provider system is based on a time period of the funds being in the escrow wallet or failing to satisfy the discrepancy in the signed exchange package or the regulatory restriction.

In some implementations, the first controlling framework and the second controlling framework are jurisdiction-specific, the first controlling framework corresponding to a first jurisdiction and the second controlling framework corresponding to a second jurisdiction, and the first set of controlling parameters of the first controlling framework includes at least one controlling parameter different from the second set of controlling parameters of the second controlling framework.

In some implementations, the signed exchange package is signed using digital signature authenticated using a cryptographic method, and the signed exchange package is further signed based on satisfying a third set of controlling parameters of a central provider of the second jurisdiction, and the escrow wallet system freezes the plurality of funds by restricting exchanges using exchange security restrictions preventing fund disbursement, and the operating account data structure is an exchange ledger that stores funds designated for processing, the operating account data structure maintains a record of deposits, withdrawals, and exchanges.

In some implementations, processing the controlled release of the funds to the central provider system corresponds to a forfeiture of the funds to a government entity regulating the recipient provider, and processing the controlled release of the funds to the sender provider computing system corresponds to a return of the funds to the sender provider.

In some implementations, the modeling includes executing one or more smart contracts including executable code to verify compliance of the exchange of funds with the first controlling framework, and the one or more smart contracts automatically generates the exchange flag, embeds the exchange flag into the signed exchange package, and freezes the funds by routing the signed exchange package to the escrow wallet.

In some implementations, the escrow wallet system includes a plurality of escrow accounts, and routing the signed exchange package to the escrow wallet is further based on a type of exchange flag of a plurality of types of exchange flags, the plurality of types of exchange flags include terrorism detection, non-compliant exchange detection, regulatory detection, or office of foreign assets control (OFAC) detection.

In some implementations, the one or more processing circuits further configured to generate a compliance report including information supporting one or more reasons for routing of the funds to the escrow wallet and generate and present a graphical user interface (GUI) dashboard includes real-time information regarding a compliance status of the exchange of funds, a location of the funds, and the discrepancy in the signed exchange package or the regulatory restriction.

In some implementations, the one or more processing circuits further configured to in response to processing the controlled release, determine an interest amount based on a duration the funds were frozen in the escrow wallet and process one or more interest payments to at least one of the sender provider, the recipient provider, the sender, or the recipient.

Some implementations relate to a non-transitory computer readable medium (CRM) including one or more instructions stored thereon that, when executed by one or more processing circuits, cause the one or more processing circuits to perform operations including maintaining an operating account data structure including a plurality of funds of a recipient provider, maintaining the operating account data structure includes storing the plurality of funds under a first controlling framework corresponding with a first set of controlling parameters. The non-transitory CRM including the one or more instructions stored thereon that, when executed by the one or more processing circuits, cause the one or more processing circuits to further perform operations including receiving, from a sender provider computing system, a signed exchange package for an exchange of funds between a sender of a sender provider and a recipient of the recipient provider, the signed exchange package is signed based on satisfying a second set of controlling parameters of a second controlling framework of the sender provider. The non-transitory CRM including the one or more instructions stored thereon that, when executed by the one or more processing circuits, cause the one or more processing circuits to further perform operations including modelling the signed exchange package using the first controlling framework to generate an exchange flag, the first set of controlling parameters of the first controlling framework are accessed from one or more data feeds of a plurality of access locations, the exchange flag is generated based on a detection of a discrepancy in the signed exchange package or a regulatory restriction. The non-transitory CRM including the one or more instructions stored thereon that, when executed by the one or more processing circuits, cause the one or more processing circuits to further perform operations including routing the signed exchange package including the funds and the exchange flag from the operating account data structure to an escrow wallet of an escrow wallet system of the recipient provider. The non-transitory CRM including the one or more instructions stored thereon that, when executed by the one or more processing circuits, cause the one or more processing circuits to further perform operations including monitoring the funds within the escrow wallet based on receiving or accessing additional data from at least one of the one or more data feeds of the plurality of access locations or the sender provider computing system. The non-transitory CRM including the one or more instructions stored thereon that, when executed by the one or more processing circuits, cause the one or more processing circuits to further perform operations including processing a controlled release of the funds from the escrow wallet to a wallet system of the recipient, to the sender provider computing system, or a central provider system, the controlled release to the wallet system is based on satisfying the discrepancy in the signed exchange package or the regulatory restriction, and the controlled release to the sender provider computing system or the central provider system is based on a time period of the funds being in the escrow wallet or failing to satisfy the discrepancy in the signed exchange package or the regulatory restriction.

In some implementations, the first controlling framework and the second controlling framework are jurisdiction-specific, the first controlling framework corresponding to a first jurisdiction and the second controlling framework corresponding to a second jurisdiction, and the first set of controlling parameters of the first controlling framework includes at least one controlling parameter different from the second set of controlling parameters of the second controlling framework.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers indicate identical, functionally similar, and/or structurally similar elements.

Figure 1:
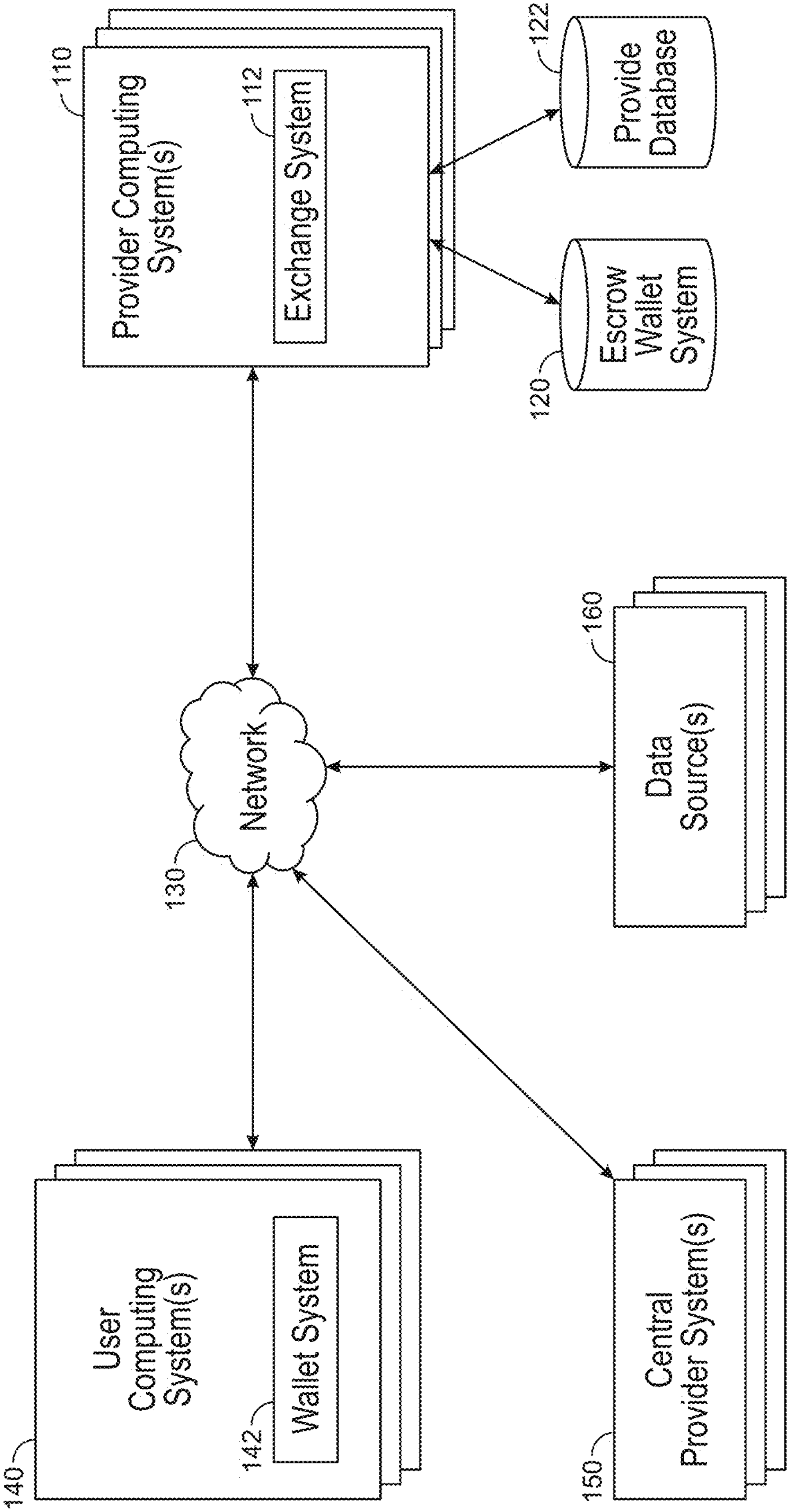
FIG. 1 depicts an example system, according to some implementations.

It will be recognized that some or all of the FIGS. are schematic representations for purposes of illustration. The FIGS. are provided for the purpose of illustrating one or more embodiments with the explicit understanding that they will not be used to limit the scope of the meaning the claims.

DETAILED DESCRIPTION

The present implementations will now be described in detail with reference to the drawings, which are provided as illustrative examples of the implementations so as to enable those skilled in the art to practice the implementations and alternatives apparent to those skilled in the art. Notably, the Figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice versa, as will be apparent to those skilled in the art, unless otherwise specified herein. In the present specification, an implementation showing a singular component should not be considered limiting; rather, the present disclosure is intended to encompass other implementations including a plurality of the same component, and vice versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

This disclosure relates to systems and methods for modeling exchanges using one or more controlling framework. The technical solution described herein shifts the computing resource from primarily monitoring client compliance to scrutinizing the compliance status of exchanges themselves. In some implementations, when a transaction is flagged due to potential regulatory concerns—which could range from OFAC violations to broader international financial regulations or other discrepancies—the funds can be frozen and routed into an escrow wallet. The systems and methods can be implemented within an ecosystem including a plurality of sending and receiving institutions, each maintaining multiple jurisdiction-specific escrow accounts to manage the diverse regulatory landscapes they operate within.

Traditionally, transaction management processes have been plagued by computing resource inefficiencies, particularly in scenarios involving manual monitoring and delayed compliance verification. These issues are exacerbated in cross-border transactions where compliance with disparate regulatory frameworks can present unique technological problems. The inherent delay in detecting and responding to compliance issues typically results from the sequential and manual verification processes that are common in traditional financial systems. These delays introduce significant latency in transaction processing, which can lead to inefficiencies in the allocation of computing resources and increased operational overhead. Moreover, the latency complicates the enforcement of compliance policies, making it challenging to synchronize transaction monitoring with the dynamic nature of regulatory updates. This inefficiency in compliance enforcement can result in systems failing to detect and address violations promptly, leading to breaches of regulatory mandates. Such breaches can trigger legal repercussions, including sanctions and penalties, and may increase the incidence of system-participating entities inadvertently contravening established legal standards. This not only complicates compliance adherence but also exposes the integrity of the regulatory framework within which these systems operate, affecting their standing in regulatory assessments and oversight evaluations.

The implementations described herein introduce a technical solution by modeling exchange to generate flags used to divert exchange funds into escrow accounts based on real-time analysis of the transaction's compliance with applicable regulations. The implementations can advance technical systems by utilizing a model-based approach to dynamically manage data compliance. The systems and methods can employ steps and actions to perform real-time analysis to detect discrepancies or non-compliance within exchanges. Upon detection, the model can trigger protocols that redirect data to secure holding areas for further validation, all without manual intervention. This process is enhanced by integrating smart contracts that execute predefined actions based on specific compliance triggers identified during the data analysis.

Such a system introduces a novel approach to exchange compliance, where the exchange itself is the indicator of regulatory adherence, not just the entities involved. The use of jurisdiction-specific escrow accounts to manage and temporarily hold funds in response to compliance issues represents an improvement over traditional methods, which typically include more manual interventions and rely heavily on after-the-fact compliance verification. These implementations employs a technical design improvement wherein exchanges can be modeled to meet compliance standards and to preemptively address regulatory requirements. These architectural implementations can improve the processing of cross-border transactions by integrating compliance checks directly into the exchange workflow. Such integration provide technical improvements to operational execution and reduces the occurrence of compliance-related interruptions, thereby increasing the throughput and efficiency of processing systems.

Referring to FIG. 1, a block diagram of an example system is shown, according to some implementations. The example system is shown to include provider computing system 110, escrow wallet system 120, provider database 122, user computing system 140, central provider system 150, and data sources 160. The components of the example system may be connected, or in communication, via a network 130. Network 130 may include computer networks such as the Internet, local, wide, metro or other area networks, intranets, satellite networks, other computer networks such as voice or data mobile phone communication networks, combinations thereof, or any other type of electronic communications network. Network 130 may include or constitute a display network. In some implementations, network 130 facilitates secure communication between components of example system. As a non-limiting example, network 130 may implement transport layer security (TLS), secure sockets layer (SSL), hypertext transfer protocol secure (HTTPS), and/or any other secure communication protocol. It should be noted that the number and type of components shown are merely illustrative, and in some implementations, implementations of the example system may have additional, fewer, and/or different components than those illustrated in FIG. 1.

Referring generally to FIG. 1, the providing computing systems 110 can be structured or configured to model exchanges. Generally, the providing computing system 110 can facilitate international transactions through the use of an escrow wallet system 120 to secure funds during processing. In some implementations, when an exchange is initiated, such as sending $100 from a Bank A account in the US to a Bank B account in the UK, the funds can be placed into an operating account at Bank A. For example, the transaction could be modeled, signed, and sent to Bank B directly, indicating John Doe as the recipient. In another example, the transaction could be modeled, signed, and sent through the Federal Reserve (e.g., central provider system 150) to Bank B, indicating John Doe as the recipient. The Federal Reserve could also verify that both banks have sufficient funds in their operating accounts to cover the transaction. In some implementations, if everything is verified correctly on the sender's side but an issue arises on the recipient's side, such as a discrepancy or a sanction hit, the funds can be diverted to an escrow wallet hosted by a financial institution in the UK. In some implementations, the diversion to an escrow account can be governed by a smart contract that automates the decision based on certain conditions, such as sanctions or mismatches in payment details like the wrong address (e.g., controlling framework having a set of controlling parameters). For example, a smart contract could interact with source oracles that monitor OFAC lists to verify compliance (e.g., access locations). Additionally, in some implementations, the escrow wallet could serve as a holding place for the funds until all discrepancies are resolved. The release of funds from the escrow wallet can be jurisdiction-specific, such that only certain authorized entities within the jurisdiction may release the funds. Furthermore, the entire transaction process can be linked to a digital dashboard that provides transparency for all interested parties. The dashboard can depict where the funds are at any given moment and the status of any compliance checks. For example, if funds are held in the escrow wallet, they might accrue interest, which could then be calculated and distributed according to specific programmed rules of the jurisdiction. In some implementations, hashing might be used to secure the submission of funds or the holding of funds within the escrow wallet, providing an additional layer of security and traceability. That is, the providing computing systems 110 could implement bi-temporal chain linking to verify that every stage of the transaction is recorded and verifiable.

The network 130 can facilitate communication between various nodes, such as the provider computing system 110, the user computing system 140, central provider system 150, and the data sources 160. In some implementations, data flows through the network 130 from a source node to a destination node as a flow of data packets, e.g., in the form of data packets in accordance with the Open Systems Interconnection (OSI) layers. A flow of packets may use, for example, a OSI layer-4 transport protocol such as the User Datagram Protocol (UDP), the Transmission Control Protocol (TCP), or the Stream Control Transmission Protocol (SCTP), transmitted via the network 130 layered over a OSI layer-3 network protocol such as Internet Protocol (IP), e.g., IPv4 or IPV6. The network 130 can be composed of various network devices (nodes) that are communicatively linked to form one or more data communication paths between participating devices. Each networked device includes at least one network interface for receiving and/or transmitting data, typically as one or more data packets. An illustrative network 130 is the Internet; however, other networks may be used. The network 130 may be an autonomous system (AS), i.e., a network that is operated under a consistent unified routing policy (or at least appears to be from outside the AS network) and is generally managed by a single administrative entity (e.g., a system operator, administrator, or administrative group).

Generally, the provider computing system 110, user computing system 140, central provider system 150, and data sources 160 can include one or more logic devices, which can be one or more computing devices equipped with one or more processing circuits that run instructions stored in a memory device to perform various operations. The processing circuit can be made up of various components such as a microprocessor, an ASIC, or an FPGA, and the memory device can be any type of storage or transmission device capable of providing program instructions. The instructions may include code from various programming languages commonly used in the industry, such as high-level programming languages, web development languages, and systems programming languages. The provider computing system 110, user computing system 140, central provider system 150, and data sources 160 may also include one or more databases for storing data, such as escrow wallet system 120 and provider database 122, that receive and provide data to other systems and devices on the network 130.

As will be discussed in greater detail below, the provider computing system 110 may be configured to perform exchanges according to various controlling frameworks. The provider computing system 110 can interact with the various systems of example system over network 130. In some implementations, the provider computing system 110 can include one or more processing circuits, including processor(s) and memory. The memory may have instructions stored thereon that, when executed by processor(s), cause the one or more processing circuits to perform the various operations described herein. The operations described herein may be implemented using software, hardware, or a combination thereof. The processor(s) may include a microprocessor, ASIC, FPGA, etc., or combinations thereof. In many implementations, processor(s) may be a multi-core processor or an array of processors. Memory may include, but is not limited to, electronic, optical, magnetic, or any other storage devices capable of providing processor(s) with program instructions. The instructions may include code from any suitable computer programming language. In some implementations, the provider computing system 110 can include an exchange system 112.

The exchange computing system 112 (shown as "exchange system 112") can be structured or configured to facilitate cross-border exchanges involving a sender and a beneficiary, each associated with, for example, non-US local banks, with the settlement process occurring through the Federal Reserve (e.g., provider computing system 110 or central provider system 150, which may include an exchange system with similar features and functionality of provider computing system 110). A cross-border transaction can be initiated and the exchange system 112 can implement smart contracts to validate the credentials and compliance statuses of both the sender and beneficiary banks. The smart contracts can verify that transactions adhere to international financial regulations and sanctions before any funds are moved. The exchange system 112 can interface with international financial databases and regulatory compliance systems (collectively referred to as "data sources 160") to verify that all details of the transaction align with one or more global financial protocols. Additionally, the exchange system 112 can process these validations systematically and record steps to maintain transparency in cross-border financial transactions. For example, if a discrepancy in the source of the funds is detected, the transaction can be paused, and the funds can be routed to an escrow wallet of escrow wallet system 120 (e.g., while additional verification is undertaken). In some embodiments, the exchange system 112 can include one or more processing circuits, including processor(s) and memory. The memory may have instructions stored thereon that, when executed by processor(s), cause the one or more processing circuits to perform the various operations described herein. The operations described herein may be implemented using software, hardware, or a combination thereof. The processor(s) may include a microprocessor, ASIC, FPGA, etc., or combinations thereof. In many implementations, processor(s) may be a multi-core processor or an array of processors. Memory may include, but is not limited to, electronic, optical, magnetic, or any other storage devices capable of providing processor(s) with program instructions. The instructions may include code from any suitable computer programming language.

In some implementations, after all participants have reviewed and agreed to the proposed transaction, the exchange system 112 can facilitate the monitoring and confirming consents from each party involved. For example, the exchange system 112 can authenticate agreement terms and the verification of digital signatures through secure cryptographic methods. The exchange system 112 can maintain a log of all consents. For example, during a transaction between a Canadian and a Mexican bank, the exchange system 112 would verify that both banks submit and verify agreement terms digitally, with each action logged and timestamped. If an issue such as a potential compliance breach with OFAC sanctions or a discrepancy in transaction details is identified during the transaction review (also referred to herein as "modeling", described in greater detail below) the exchange system 112 can preemptively reroute or divert the funds to a designated escrow wallet system 120. This escrow wallet system 120 can be a neutral, secure holding area for the funds while further investigations or corrections are undertaken. That is, the escrow wallet system 120 can provide a secure buffer that allows for the resolution of issues without exposing the security of the funds or the financial positions of the involved parties. For example, if during a transaction involving European and Asian banks, a sanction breach is suspected, the exchange system 112 could automatically divert the funds into an escrow wallet, halting the transaction until the issue is thoroughly investigated and resolved.

As shown, in some implementations, the exchange system 112 can act as an intermediary provider computing system (e.g., intermediary bank or financial institution) that can facilitate, monitor, and control transactions between two banks. For example, the exchange system 112 can act as an intermediary when banks involved are from different jurisdictions and must comply with varying regulatory frameworks. For example, when a bank from Canada sends funds to a bank in Mexico, each adhering to their respective country's financial regulations and sanctions, the exchange system 112 can manage and model the transaction. The modeling can include verifying that all transaction details are compliant with OFAC regulations, among others, and handling any discrepancies or regulatory concerns that might arise during the transaction process. For example, upon receiving a signed exchange package or an exchange request (e.g., un-signed or un-verified) from the sender's bank, which includes the data packet of the funds and the signature of the sender bank, the exchange system 112 can store this package within its operating account data structure (e.g., in provider database 122). This can be completed under a specific controlling framework that aligns with a set of controlling parameters, accessed via a variety of data feeds from multiple access locations (e.g., data sources 160). The exchange system 112 can model the signed exchange package or exchange request to identify one or more discrepancies or a regulatory issue using the controlling framework to generate an exchange flag. This flag, can be embedded into the signed exchange package or exchange request, flagging the transaction for potential issues requiring further investigation or immediate action. In some implementations, if flagged, the exchange system 112 can freeze the funds by routing the signed exchange package to an escrow wallet within the escrow wallet system 120 of the intermediary provider (e.g., such that the funds may be un-accessible to the sender bank and the recipient bank. The freezing process can prevent the funds from being transferred to the recipient bank until the discrepancy or regulatory restriction has been satisfactorily addressed. The funds and exchange details can be monitored, with the exchange system 112 accessing additional data from the data feeds to resolve the flagged issues. Depending on the outcome, if the issues are resolved within a certain period, the funds can either be released to the recipient's bank or, if the issues remain unresolved or are deemed too significant, the funds can be sent back to the sender's bank in a controlled release based on the time the funds have been in the escrow wallet or the nature of the compliance failure.

The exchange system 112 can be structured or configured to maintain an operating account data structure including a plurality of funds of a recipient provider. In some implementations, maintaining the operating account data structure can include storing the plurality of funds under a controlling framework corresponding with a set of controlling parameters. That is, the exchange system 112 can verify compliance with various regulatory frameworks. In some implementations, the operating account data structure organizes and maintains financial information. The operating account data structure can be utilized to track the status and availability of funds (e.g., of customers, such as individuals or entities of the provider). For example, operating account data structure can record details such as the amount of funds, the owner of the funds, and any pending transactions. In some implementations, the plurality of funds can be variety of monetary assets managed within the provider computing system 110. The plurality of funds can include different currencies, cryptocurrencies, transaction amounts, and/or fund types. For example, funds could include of daily operational funds, reserve funds, transaction or exchange funds, temporary funds, and/or funds marked for specific regulatory purposes. In some implementations, the recipient provider can be a bank or financial institution receiving funds. The recipient provider can operate the provider computing system 110. The recipient provider can manage the distribution, transfer, or storage of these funds to the intended end-users or accounts. For example, the recipient provider may process funds transferred for payroll services, supplier payments, other operational expenses, peer-to-peer transactions, company-to-customer transactions, customer-to-company transactions, company-to-company (or business-to-business (B2B)) transactions, cryptocurrency wallet-to-cryptocurrency wallet transaction, other wallet-to-wallet transactions, etc.

In general, an exchange system 112 of a particular provider (e.g., recipient, sender, third-party, intermediary) can apply and implement various jurisdictional specific procedures, protocols, and regulations. That is, the exchange system 112 can verify compliance with various jurisdiction-specific procedures, protocols, and regulations before processing any transactions. For example, a jurisdictional specific procedure may be the verification of customer identity against a government database. In another example, a jurisdictional specific protocol may be the encryption of all data transmissions. In another example, a jurisdictional specific regulation may be the adherence to local data protection laws. In some implementations, each exchange system 112 can also apply and implement provider-specific rules or parameters related to storing funds, exchange funds, or using the particular provider for services. That is, the exchange system 112 can enforce provider-specific rules to verify the security and compliance of transactions. For example, the exchange system 112 may reject any transactions that exceed predefined spending limits set by the provider.

In some implementations, a controlling framework can be a set of regulatory guidelines for managing transactions. That is, the controlling framework can influence how transactions are processed, monitored, and reported. For example, the controlling framework implemented by the exchange system 112 may be used enforce compliance with international sanctions or anti-money laundering standards. In some implementations, a set of controlling parameters can provide specific rules within the controlling framework. The set of controlling parameters can include the operational limits, such as transaction thresholds or flags for suspicious activity, monitoring processes for continuous compliance, criteria for flagging unusual transaction patterns, requirements for documentation and proof of identity, steps for escalation and review of flagged transactions, regulations or laws, good or service type restrictions (e.g., cannot buy or sell a specific drug or medication in Country X), or any procedures related to the validation of payments between providers (e.g., cross-border). For example, the set of parameters may have rules dictating the maximum allowable transaction size without additional verification or review. In another example, the set of parameters may be guidelines for automatically flagging transactions that deviate from typical customer patterns as potentially suspicious. In yet another example, the set of parameters may include terrorist-watch list information or other government data related to individuals prohibited from being transacted with. In yet another example, the set of parameters may be protocols requiring additional documentation for transactions exceeding a certain threshold or involving high-risk countries, in compliance with OFAC regulations. In yet another example, the set of parameters may be rules for handling exchanges for particular goods or services (e.g., drugs or medications outlawed or highly regulated in jurisdiction X).

In some implementations, the set of controlling parameters can also include the documentation for high-value transactions, methods for resolving transaction disputes, approaches to handle cross-jurisdictional transfers, or any criteria for blocking or flagging transactions. In another example, the set of parameters may have rules dictating the maximum allowable transaction size without additional verification or review. In another example, the set of parameters may be guidelines for handling returns and refunds. In yet another example, the set of parameters may be protocols for exchanging currency in international transactions.

In some implementations, the sender provider computing system (e.g., another provider computing system 110) can facilitate the initiation of transactions. That is, the sender provider computing system can process and verify the compliance of outgoing financial exchanges. For example, the sender provider can verify transactions comply with a controlling framework of the jurisdiction of the sender provider. In this example, the sender provider can verify adherence to anti-money laundering protocols required by international banking standards. Additionally, the sender provider may provide transaction details to a central provider system 150 (e.g., federal reserve or another government entity) to verify the availability of sufficient funds and confirm compliance with financial regulations. In this example, the central provider system 150 may perform a secondary validation to verify all transaction details meet the required standards before final approval. In yet another example, the sender provider can verify all transaction data is encrypted and securely transmitted to the recipient provider using one or more encryption protocols.

The exchange system 112 can be structured or configured to receive a signed exchange package for an exchange of funds between a sender of a sender provider and a recipient of the recipient provider. The exchange system 112 can receive the signed exchange package from a sender provider computing system (e.g., another provider computing system 110). In some implementations, the signed exchange package can be signed based on satisfying a set of controlling parameters of a controlling framework of the sender provider. In some implementations, the signed exchange package can contain the information for conducting a financial transaction. The signed exchange package can include data such as the amount, transaction date, and participating entities. For example, the signed exchange package can digitally signed to confirm the integrity and authenticity of the transaction details.

In some implementations, a first controlling framework and a second controlling framework can be jurisdiction-specific. That is, a first controlling framework can correspond to a first jurisdiction, such as the United States, where transactions are processed according to specific regulatory requirements, including OFAC regulations and anti-terrorism measures tailored to U.S. standards. The second controlling framework can correspond to a second jurisdiction, such as Germany, where transactions must comply with German banking regulations, which include checks against a separate list of sanctioned entities and specific anti-terrorism laws applicable within Germany. Furthermore, a first set of controlling parameters of the first controlling framework can include unique specifications like screening against the U.S. specific sanctions list. In contrast, the second set of controlling parameters of the second controlling framework may involve scrutiny as per the European Union's sanction list which might differ from the U.S. standards. As shown, the first controlling framework with the first set of controlling parameters manages compliance with U.S. anti-terrorism and sanction laws, while the second controlling framework with the second set of controlling parameters ensures compliance with the distinct but similarly intended European regulatory standards.

Generally, the signed exchange package can be a data package containing various embedded information. In some implementations, the data package can be formatted to include metadata that facilitates traceability and auditing. That is, the signed exchange package can be configured to automatically update the operating account data structure with the transaction status. For example, transaction IDs and timestamps can be logged for future reference. Furthermore, signing may include using a digital signature authenticated using a cryptographic method to verify the data integrity and sender authenticity are maintained throughout the transaction process. In another example, keys used for digital signatures are managed through a secure key management protocol. Additionally, the signed exchange package can be transmitted to various provider computing systems 110 by secure electronic communication channels (e.g., over network 130) that provide data integrity and confidentiality. For example, a sender provider may sign an exchange by applying a digital signature that matches the private key registered with the transaction network. In this example, the recipient provider may receive the signed exchange package and verify the signature against the public key to confirm the sender's identity and the package's authenticity.

In some implementations, the exchange of funds can occur between a sender associated with a sender provider (e.g., sending bank or financial institution) and a recipient associated with a recipient provider (e.g., receiving bank or financial institution). The exchange of funds can be facilitated through various payment networks and systems. For example, the exchange of funds could include multiple currencies and require currency conversion processes. In some implementations, the sender of a sender provider can initiate the transfer of funds. Furthermore, the sender can authorize the transaction using secure methods like biometric verification or multi-factor authentication. For example, the sender may be an individual or a corporation requiring large-scale fund transfers for business operations. In another example, the sender may be an individual sending money to a foreign country where relatives or family reside. In yet another example, the sender may be an individual performing a transfer with a foreign company or individual in return for a good or service. In some implementations, the recipient of the recipient provider is the beneficiary of the transferred funds. That is, the recipient can access the funds once all security checks and compliance measures are satisfied (e.g., by both the sender and recipient provider). For example, a recipient may need to verify identity or account details before the funds are fully accessible.

In some implementations, a different set of controlling parameters can govern the authorization of transactions by the sender provider. That is, the set of controlling parameters can specify conditions like transaction volume limits, types of permissible transactions, and geographic limitations. For example, a controlling parameter could be a limit on the maximum amount that can be transacted without additional senior approval. In another example, a controlling parameter could be prohibiting transactions involving certain high-risk countries. In yet another example, a controlling parameter could be mandatory due diligence checks for transactions exceeding a certain financial threshold.

In some implementations, some of the controlling parameters may be similar across providers (e.g., jurisdiction-agnostic, or provider-agnostic). For example, requirements for KYC (Know Your Customer) and AML (Anti-Money Laundering) compliance might be standardized across different jurisdictions. In another example, data encryption standards required for transaction security could be uniform to protect against data breaches. In some implementations, the controlling parameters may not be similar across providers (e.g., jurisdiction-specific, or provider-specific). For example, a terrorist list might require providers in certain jurisdictions to immediately freeze transactions and report to local financial intelligence units. In another example, a transfer of funds for the sale of a particular drug may require specific health and safety documentation to be verified before the transaction can be approved.

In some implementations, the signed exchange package can be securely received by the exchange system 112. The signed exchange package can include all transaction details required for processing (e.g., by the recipient provider). For example, the signed exchange package can include the amount, transaction metadata, and one or more digital signatures from the sending party. In this example, the amount may be expressed in a single or multiple currencies depending on the transactional context, and the transaction metadata could include details such as the purpose of the transaction, associated invoices, or contract numbers. Furthermore, the one or more digital signatures may be validated using a chain of trust that confirms each party's identity and their authority to execute the transaction. In some implementations, the funds of the signed exchange package can represent the monetary value being transferred. The funds can be in various currencies depending on the transaction requirements. For example, the funds might be in US dollars, cryptocurrency, Japanese Yen or Euros, depending on the sender's and recipient's locations.

In some implementations, the operating account data structure can be maintained by the exchange system 112 to manage incoming transactions. The operating account data structure may be stored in provider database 122. That is, the operating account data structure can be organized to automatically categorize transactions by type, date, and compliance status. The operating account data structure can store multiple transaction records for accountability and auditing purposes. For example, the operating account data structure can be used to log each transaction detail such as date, amount, recipient details, payment method, compliance flags, and involved parties to provide financial compliance and record-keeping.

The exchange system 112 can be structured or configured to store the signed exchange package including the funds of the signed exchange package into the operating account data structure. In some implementations, the signed exchange can be a transaction that includes verified signatures and financial data. The signed exchange can be analyzed for authenticity and adherence to set regulations before processing. For example, signed exchange can be validated by various providers (e.g., recipient, sender, or central) to confirm one or more signatures are genuine and the transaction meets legal standards.

The exchange system 112 can be structured or configured to model the signed exchange using the first controlling framework to generate an exchange flag. In some implementations, the first set of controlling parameters of the first controlling framework can be accessed from one or more data feeds of a plurality of access locations. Additionally, the exchange flag can be generated based on a detection of a discrepancy in the signed exchange or a regulatory restriction. In some implementations, the exchange flag can serve as an alert system within the transaction processing pipeline. That is, exchange flag can be triggered by anomalies in transaction data or potential regulatory breaches. For example, an exchange flag may be generated if transaction amounts exceed certain thresholds or if sanctioned entities are detected. Additionally, when the exchange system 112 is acting as an intermediary, an exchange request (un-signed or un-verified) can be modeled. That is, the exchange system 112 can be an intermediary provider computing system (e.g., another provider computing system 110) which receives an exchange request or a signed exchange package (if one or more verification are performed) from a sender provider computing system and models the exchange to verify the exchange or generate an exchange flag. For example, if during modeling, a transaction is flagged for involving a sanctioned entity, the exchange system 112 can generate an exchange flag based on an analysis of the transaction details and the latest sanction lists indicating potential non-compliance. In this example, the exchange system 112 can notify both the sender and recipient banks, ensuring that all parties are aware of the compliance issues before proceeding further with the transaction.

Generally, modeling the signed exchange can include applying a controlling framework to transaction data (e.g., to process, verify, and/or authenticate an exchange). That is, modeling can include retrieving details to satisfy the controlling parameters of the controlling framework from various data sources, such as financial databases and regulatory compliance systems, which provide real-time data on transactional activities, associated entities, and relevant metadata. In some implementations, modelling can include accessing and applying a predefined set of controlling parameters that prescribe the compliance requirements. For example, the set of parameters might include checking transaction amounts against legal thresholds or matching transaction parties against a list of sanctioned entities. That is, modeling can be a rule-based model to compare transaction's data against these controlling parameters. For example, executable code of a model could scan transaction amounts to detect values exceeding regulatory thresholds or analyze geographic origins of transactions to identify any originating from high-risk jurisdictions. If a transaction does not satisfy or diverges from the set of parameters, such as a transaction amount surpassing the legal limit without requisite flags or approvals, the exchange system 112 can generate an exchange flag indicating potential non-compliance.

Generally, generating an exchange flag can occur when discrepancies are detected within a signed exchange package or when transactions violate regulatory restrictions. That is, the modeling can be executed to monitor and analyze transaction data against a controlled set of parameters, derived from a predetermined controlling framework. When a transaction flows through the exchange system 112, the exchange data and attributes—such as origin, amount, and recipient details—are modeled against regulatory guidelines like OFAC sanctions or internal compliance rules. Upon detecting a discrepancy, such as a transaction originating from a sanctioned country or involving a person on a watchlist, or identifying a breach of transaction limits as specified in the controlling framework, the exchange system 112 can generate a flag. The flag generation can be achieved through the execution of a specific subroutine, which can mark (e.g., embed, store, append) the signed exchange package as suspect or non-compliant. The subroutine can encapsulate the details of the discrepancy into a flag object, which can include the nature of the discrepancy, associated transaction details, and a timestamp. The flag object can then be attached to the transaction data packet as part of its metadata. In some implementations, the exchange system 112 can trigger a function to create an exchange flag. For example, the function can encapsulate the specifics of the anomaly detected, assign a unique identifier to the flag, and link it to the transaction record for traceability. In this example, the flag can then be encoded as part of the transaction metadata.

In some implementations, modeling can also include signing the exchange request or signed exchange package based on verifying that the exchange (e.g., exchange request or signed exchange package) satisfies regulatory restrictions and no discrepancies are present. That is, when the exchange system 112, acting either as an intermediary or directly as the sender or recipient provider, can sign the exchange confirming that all elements of the transaction align with the set controlling parameters without any anomalies. Once this verification is complete and the transaction is deemed compliant, the exchange system 112 can sign the exchange request or the signed exchange package (e.g., double signed, by both the sender and recipient provider computing system). The signature can serve to authenticate the transaction's validity and verify that it is ready for further processing or direct execution. Generally, the signing process can include employing cryptographic techniques to apply a digital signature that certifies the transaction has passed all necessary checks and screenings according to the prescribed regulatory framework. For example, the digital signature can act as a seal of approval that is traceable (e.g., on a blockchain or distributed ledger). For example, if the exchange system 112 models a transaction involving funds transfer from a U.S. bank to a European bank and finds no discrepancies with OFAC or EU financial regulations, it can sign the transaction, indicating it has cleared all necessary compliance hurdles without issue. This signed transaction is then ready to be executed (e.g., a controlled release of funds to the wallet system 142 of the recipient) or transmitted to the recipient provider computing system.

Additionally, modeling can include one or more smart contracts comprising executable code to verify compliance of the exchange of funds with a controlling framework. These smart contracts are programmed to automatically execute upon the detection of specific conditions predefined within the transaction parameters. The smart contracts may analyze the data encapsulated within the signed exchange package to assess compliance with the applicable regulatory frameworks. If the transaction meets the required compliance criteria, the smart contracts facilitate the continuation of the transaction process. Conversely, if a discrepancy or regulatory breach is detected, the smart contracts initiate the generation of an exchange flag, effectively halting the transaction until further verification or corrective measures are implemented. For example, a smart contract might halt a transaction involving a party on an international sanctions list, or it might flag transactions that exceed monetary thresholds set by regulatory bodies without proper authorization.

In some implementations, data feeds can provide real-time and/or up-to-date information to support the transaction processing by the exchange system 112. The data feeds can be provided by data sources 160. That is, the exchange system 112 can interface with the data sources 160 by establishing communication protocols. For example, an API call can be transmitted to an API gateway (e.g., access location) of one or more data sources 160. In another example, synchronous data pull requests may be initiated to retrieve compliance information. In yet another example, asynchronous push notifications from data sources 160 could alert the exchange system 112 to changes in regulatory status. That is, the access locations may be international financial databases, regulatory bodies' listings, government feeds, other bank feeds, risk assessment tools, financial market feeds, or any automated compliance monitoring systems. For example, access locations may be external services or oracles that can be used by the exchange system 112 to fetch and access data for modeling and verification of an exchange. In some implementations, data feeds can provide updates on regulatory changes, watchlists, standard transaction profiles. For example, the data feeds may be accessible or provide daily updates on OFAC-sanctioned entities and countries. In another example, the data feeds may be used to provide real-time alerts on emerging regulatory risks or laws. In yet another example, continual data streaming may support dynamic transaction validation processes.

In some implementations, the exchange system 112 can determine a first access location of the plurality of access locations of the one or more data feeds corresponding to primary regulatory data sources. That is, the primary regulatory data sources may include jurisdiction-specific data, and the second regulatory data sources may include jurisdiction-agnostic data. For example, the primary regulatory data sources (e.g., data sources 160) may be government compliance databases and local financial authority listings. In this example, the first access location may be a secure government API providing real-time updates on financial regulations. In some implementations, the exchange system 112 can determine a second access location of the plurality of access locations of the one or more data feeds corresponding to secondary regulatory sources. For example, the secondary regulatory data sources (e.g., data sources 160) may be international financial market data feeds and global compliance registries. In this example, the second access location may be an international regulatory information service platform.

In some implementations, the data sources 160 can be diversified across multiple regulatory regions. The provider computing systems 110 and other systems described herein can interface with the data sources 160 by utilizing batch or real-time data integration. For example, the central provider system 150 may provide regulatory updates or new laws to the data sources 160. In turn, the data sources 160 may access and/or analyze this information through structured data channels. In another example, the user computing system 140 may make social media posts or announcements that the data sources 160 can gather or web-scrape. In turn, the data sources 160 may make accessible this data for compliance modeling. For example, when social media posts are made by a recipient which depict illegal activity, the exchange system 112 may obtain that data via the data feeds of the data sources 160 and generate a flag when an exchange occurs between the recipient and a sender.

In some implementations, the exchange system 112 can be structured or configured to embed the exchange flag into the signed exchange package. Additionally, when the exchange system 112 is acting as an intermediary, the exchange flag may be embedded into an exchange request and/or a signed exchange package (depending on if the sender provider system performed compliance verification).

That is, the exchange system 112 can be an intermediary provider computing system (e.g., another provider computing system 110) which received an exchange request or a signed exchange package (if one or more verification are performed) from a sender provider computing system and embed the exchange flag. For example, when a transaction involving large fund transfers between countries with high financial risk is processed, the exchange system 112 can embed an exchange flag directly into the signed exchange package to highlight the need for additional verification due to the transaction's higher risk profile. In this example, the intermediary provider system upon receiving this flagged exchange package, proceeds with heightened scrutiny by routing the exchange request or signed exchange package to the escrow wallet and applying additional security measures to verify the transaction's legitimacy and verify that all regulatory and security protocols are followed. That is, embedding can include digital signing and cryptographic verifying the transaction data. Generally, embedding can ensure that the integrity and authenticity of the transaction flags are maintained throughout the transaction lifecycle. In some implementations, the exchange flag can be an indicator of potential issues within a transaction, such as regulatory non-compliance or data mismatches. The exchange flag can trigger a freezing of the funds by routing the signed exchange package to an escrow wallet of an escrow wallet system 120. That is, the provider database 122 may store the operating account data structure where transaction histories and statuses are logged. However, upon generating and embedding the flag, the exchange system 112 can route or re-store the signed exchange package into the escrow wallet system 120. Furthermore, the flag can be encoded by the exchange system 112 into the signed exchange package using a format recognizable by all subsequent processing systems. In some implementations, the embedding of the flag can include using cryptographic protection techniques to secure the integrity of the transaction data. That is, the exchange system 112 may apply cryptographic algorithms such as SHA-256 for hashing, which can provide a hash value of the transaction data including the flag. This hash, along with a digital signature using the institution's private key, can be appended to the signed exchange package.

In some implementations, the exchange system 112 can be structured or configured to freeze the funds by routing the signed exchange package including the funds and the exchange flag from the operating account data structure (e.g., stored in the provider database 122) to an escrow wallet of an escrow wallet system 120. In some implementations, freezing the funds can include temporarily holding the transaction amount in a secure state pending further verification. Freezing can prevent the transaction from completing until all regulatory checks or discrepancies are satisfied. For example, the funds are frozen if a discrepancy or regulatory issue is flagged in the signed exchange data. In some implementations, routing refers to the transfer of data and funds from the operating account structure to the designated escrow system. For example, the signed exchange package, including the funds and any flags, is routed from the operating account to an escrow wallet for further monitoring (e.g., until a description is satisfied or a regulatory restriction is satisfied). In some implementations, the escrow wallet of escrow wallet system 120 can be as a neutral holding area for funds during transaction disputes or verifications. The escrow wallet can safeguard the funds until all conditions for the transaction are met or resolved. For example, escrow wallet can hold the funds when there's an OFAC flag or other regulatory concerns until cleared.

In some implementations, the escrow wallet system 120 can be structured or configured to manage and secure funds flagged for compliance review or pending regulatory clearance. For example, the exchange system 112 can route signed exchange packages from an operating account data structure of the provider database 122 to an escrow wallet of the escrow wallet system 120. In some implementations, the plurality of escrow wallets within the escrow wallet system 120 can be implemented as separate ledger entries within a database managed by the escrow wallet system 120. Each wallet can be uniquely identified and linked to particular transaction conditions, such as OFAC compliance, anti-money laundering measures, specific country regulations, and so on. The escrow wallet system 120 can operate by interfacing with the provider database 122 to receive transaction data, which includes flags for potential compliance issues. Upon receiving a signed exchange package that triggers a compliance flag, the escrow wallet system 120 can route the associated funds into the appropriate escrow wallet. This routing can be managed through workflows that recognize the specific flag associated with the transaction, querying the provider database 122 for the appropriate escrow wallet based on pre-defined rules set within the escrow system's logic. Funds within the escrow wallets may not be physically moved but are represented by changes in the database states, reflecting the status of the funds as "held in escrow." This state change is secured by transaction logs that can record the movement from operational funds to escrow status, providing an auditable trail of compliance-related fund handling. The actual 'storage' of funds can include modifying the access permissions and visibility of these funds, effectively restricting their use until compliance clearance is confirmed. Each wallet's balance and transaction history can be maintained continuously and updated in real-time to reflect incoming or outgoing transactions, ensuring that all movements are tracked and reversible following regulatory approvals or further compliance checks.

In some implementations, the provider database 122 can be structured or configured to store and manage data related to transactions, user information, compliance documentation, and historical transaction records. The exchange system 112 can interact with the provider database 122 by making API calls, running query operations, or initiating data synchronization processes to provide up-to-date transaction handling and compliance monitoring. For example, the API calls may be designed to retrieve specific transaction details or to update transaction status based on compliance checks. The provider database 122 can be queried by the exchange system 112 for details or information stored in the operating account data structures. For example, when a signed exchange package is received, the exchange system 112 can store the signed exchange package in the operating account data structure by logging all transaction details including date, amount, participants, and compliance flags. Security measures, such as encrypted storage and access control mechanisms, can be implemented in the provider database 122 to protect sensitive information from unauthorized access or data breaches.

Furthermore, the escrow wallet system 120 can include a plurality of escrow accounts. In some implementations, routing the signed exchange package to the escrow wallet can be further based on a type of exchange flag of a plurality of types of exchange flags. That is, the type of exchange flags could include but are not limited to terrorism detection, non-compliant exchange detection, regulatory detection, office of foreign assets control (OFAC) detection, financial fraud alerts, cross-border transaction monitoring, or any compliance alerts. For example, a terrorism detection type flag may be generated based on matches against the OFAC list. In this example, the terrorism detection type flag would facilitate a routing of the signed exchange package to a terrorism escrow wallet. In another example, a non-compliant exchange detection flag may be generated based on discrepancies in declared transaction values versus actual values. In this example, the non-compliant exchange detection flag would facilitate a routing of the signed exchange package to a compliance escrow wallet.

In some implementations, the smart contract can include executable code to evaluate transaction parameters against the predefined rules of the controlling framework. The executable code can analyze the data fields within the transaction to facilitate compliance. For example, the executable code may be written in a programming language for writing smart contracts on Ethereum-based platforms. Furthermore, the smart contracts can execute the various actions based on the validation results from the exchange system 112.

In some implementations, the provider computing system 110 can be a node of a distributed ledger. That is, the provider computing system 110 can store the one or more smart contracts on the distributed ledger (e.g., where a copy can be stored in provider database 122). Furthermore, the exchange system 112 can execute the one or more smart contracts by verifying compliance with the controlling framework and updating a compliance status or a compliance result on the distributed ledger. That is, verifying compliance can include scanning transaction details against regulatory requirements and sanctions lists. For example, the compliance check may involve verifying the identity and legal status of transaction parties against government databases. In some implementations, a compliance status may be active or resolved. For example, the compliance status may be marked as resolved once all regulatory requirements are met without discrepancies. In some implementations, a compliance result may be approval or denial. For example, the compliance result may be approval when transactions fully comply with regulatory standards. That is, updating the compliance status may include recording the date and outcome of the review. Furthermore, updating the compliance result may include logging the details and justifications for compliance decisions.

In some implementations, the exchange system 112 can be structured or configured to monitor the funds within the escrow wallet of the escrow wallet system 120 based on receiving or accessing additional data from at least one of the one or more data feeds of the plurality of access locations or the sender provider computing system. That is, the exchange system 112 continually checks (e.g., ping, access via API gateway) for updates from data feeds that could influence the release or further freezing of the funds. For example, the exchange system 112 may monitor updates on international sanctions that could affect the legality of the transaction.

In some implementations, the exchange system 112 can be structured or configured to process a controlled release of the funds from the escrow wallet to a wallet system 142 of the recipient, to the sender provider computing system (e.g., another provider computing system 110), or a central provider system 150. Additionally, when the exchange system 112 is acting as an intermediary, the funds can be provided to another provider computing system. That is, the exchange system 112 can be an intermediary provider computing system (e.g., another provider computing system 110) which received an exchange request or a signed exchange package (if one or more verification are performed) from a sender provider computing system and processes the exchange to send the funds to a recipient provider computing system. For example, the exchange system 112 could receive a signed exchange package from a bank in the United States intended for a bank in France, perform compliance checks, and upon successful verification, forward the package to the recipient provider. In this example, if discrepancies were found during the verification process, such as a mismatch in the amount declared and the amount transferred, the exchange system 112 would flag this issue, hold the funds in the escrow wallet, and notify both parties of the discrepancy for resolution before proceeding with the controlled release.

In some implementations, the controlled release to the wallet system 142 can be based on satisfying the discrepancy in the signed exchange package or the regulatory restriction. That is, the release is authorized when compliance resolves all discrepancies. For example, the discrepancy in the signed exchange package may be an unmatched transaction amount with invoice records. In this example, the discrepancy in the signed exchange package may be satisfied when additional documentation or correction adjustments are made and verified. In another example, the discrepancy in the regulatory restriction may be a sanction violation alert. In this example, the discrepancy in the regulatory restriction may be satisfied when it is confirmed that the alert was a false positive or the issue has been legally resolved.

Generally, processing a controlled release from the escrow wallet system 120 includes a sequence of validations and approvals to verify that the funds are disbursed in accordance with regulatory requirements and the specific stipulations of the transaction. Initially, the exchange system 112 can verify that all discrepancies or regulatory issues identified with the signed exchange package have been resolved. For example, the exchange system 112 may gather or access (e.g., from data sources 160) additional documentation or adjustments and verifying these corrections to verify they meet the compliance criteria. Once discrepancies are resolved, the exchange system 112 can initiate the release of funds to the designated recipient's wallet system 142, back to the sender's provider computing system, or to a central provider system 150, depending on the outcome of the compliance checks. The release process can contingent upon the satisfaction of all compliance conditions. For example, if a transaction remains unresolved due to lack of necessary documentation or unresolved regulatory alerts within a stipulated time frame (e.g., 90 days) the funds may be returned to the sender's provider system to reassess and address the compliance issues. Conversely, if the regulatory checks confirm compliance, the funds can proceed to the intended recipient. Furthermore, in cases where the discrepancies involve breaches of legal or regulatory standards, such as sanctions or anti-money laundering regulations, the funds may be seized or forfeited as dictated by legal authorities, such as the Financial Crimes Enforcement Network (FinCEN).

In some implementations, steps of the controlled release process, can be documented in a centralized or distributed ledger system (e.g., stored in provider database 122). The ledger can provide an immutable audit trail of actions taken during the process, including timestamps and confirmations from involved parties. In some implementations, the exchange system 112 can assess the recipient's eligibility and readiness to receive the funds. This assessment can be automated through integration with systems that manage recipient data, verifying that all requisite conditions for fund receipt are satisfied. Following this, programmed smart contracts are triggered. The smart contracts can include executable code implemented to execute fund release when all regulatory and compliance criteria are met.

In some implementations, processing the controlled release to the sender provider computing system (e.g., provider computing system 110) or the central provider system 150 can be based on a time period of the funds being in the escrow wallet. For example, if the funds remain unclaimed or under dispute for more than 90 days, they are returned to the sender. In this example, the funds are returned to the sender's bank to reassess the transaction and resolve any outstanding compliance issues. In some implementations, processing the controlled release to the sender provider computing system (e.g., provider computing system 110) or the central provider system 150 can be based on failing to satisfy the discrepancy in the signed exchange package. For example, if the required documentation is not provided within a specified timeframe, the funds are returned to the sender. In this example, the failure to provide necessary transaction evidence results in the reversal of funds to the sender's account. In some implementations, processing the controlled release to the sender provider computing system (e.g., provider computing system 110) or the central provider system 150 can be based on failing to satisfy the discrepancy in the regulatory restriction. For example, if sanction screening reveals an unresolved issue, the transaction is nullified. In this example, unresolved sanction hits lead to the cancellation of the transaction and the funds are returned to the initiating bank. In some implementations, processing the controlled release of the funds to the central provider system 150 can correspond to a forfeiture of the funds to a government entity regulating the recipient provider. That is, funds linked to illegal activities may be seized by regulatory authorities. For example, if the transaction is found to be part of a money laundering scheme, the funds may be forfeited to the Financial Crimes Enforcement Network (FinCEN). In some implementations, processing the controlled release of the funds to the sender provider computing system corresponds to a return of the funds to the sender provider. That is, if all disputes are resolved and no compliance issues remain, the funds are returned to the sender. For example, once a transaction audit is completed and the funds are deemed compliant, they are credited back to the sender's account.

In some implementations, in response to processing the controlled release, the exchange system 112 can determine an interest amount based on a duration the funds were frozen in the escrow wallet. Determining an interest amount can include calculating interest based on standard banking rates applicable during the period of fund retention. For example, accrued interest may be calculated using the average federal rate for the duration the funds were held in escrow. Furthermore, the exchange system 112 process one or more interest payments to at least one of the sender provider, the recipient provider, the sender, or the recipient. In some implementations, various entities may receive a portion of the interest payments based on their roles in facilitating or resolving the transaction. For example, interest generated during the holding period may be split between the sending and receiving financial institutions as per pre-agreed terms.

In some implementations, the exchange system 112 can update one or more controlling frameworks based on receiving or accessing the additional data from the first access location or the second location of data sources 160. That is, the exchange system 112 may receive updates on regulatory changes that require immediate implementation. For example, the exchange system 112 may receive notifications about amendments to anti-money laundering regulations that affect transaction processing. Additionally, the exchange system may access detailed guidelines on newly imposed sanctions. For example, the exchange system 112 may access detailed compliance protocols related to new sanctions against specific countries or entities. As shown, controlling frameworks may be updated to reflect these changes and ensure that the transaction processing remains compliant with the latest legal requirements.

In some implementations, the exchange system 112 can generate a compliance report including information supporting one or more reasons for routing of the funds to the escrow wallet. To generate the compliance report the exchange system 112 can aggregate data from internal audit logs and external regulatory notifications. For example, the compliance report may include details of the transaction parties, transaction values, and any flags raised during the transaction processing. In another example, the compliance report may include a timeline of events leading to the flagging and subsequent actions taken. In some implementations, a reason for routing the funds to the escrow wallet of the escrow wallet system 120 may be, but is not limited to, sanctions violations, discrepancies in transaction data, suspicious transaction patterns, regulatory audits, compliance checks, internal alerts, or any mismatches in documentation.

In some implementations, the exchange system 112 can generate and present a graphical user interface (GUI) dashboard including real-time information regarding a compliance status of the exchange of funds, a location of the funds, and the discrepancy in the signed exchange package or the regulatory restriction. For example, the compliance status may be "Pending" or "In Process", "Cleared" or "Approved", "Flagged", or "Canceled". In another example, the location of the funds may be shown along with maps or graphical indicators of banks involved in the transaction. In yet another example, the discrepancy in the signed exchange package could include mismatches in amounts or recipient details. In yet another example, the discrepancy in the regulatory restriction may be an active alert for funds linked to sanctioned entities.

The GUI dashboard may include interactable elements and content for reviewing by the recipient bank or sender bank. For example, the GUI dashboard may include signature buttons that can be selected to facilitate the review of one or more signatures of the sending or recipient bank. Upon selecting the signature button the GUI dashboard may present detailed signature validation results. In another example, the GUI dashboard may include escrow wallet location buttons that can be selected to facilitate the auditing process. Upon selecting the escrow wallet location button the GUI dashboard may present detailed transaction paths and current status of the funds. In some implementations, the GUI dashboard can include a status summary for the financial institution to view flagged, approved, canceled, and in process exchanges occurring at the particular financial institution.

In some implementations, the central provider system 150 can be a centralized financial system or governmental agency such as a central bank that can oversee and facilitate transactions between banks (e.g., inherently between customers of those banks). In some implementations, the central provider system 150 can include one or more processing circuits that can execute functions for compliance verification and fund validation across financial transactions. The central provider system 150, such as a central bank, can verify that all participating institutions adhere to the agreed protocols and standards by conducting routine and surprise compliance audits, reviewing transaction logs, and cross-verifying transaction details against international regulatory lists (e.g., controlling framework). The central provider system 150 can function as a centralized authority that validates the availability and adequacy of funds in connected financial institutions before transaction execution. In some implementations, central provider system 150 can directly communicate (e.g., over network 130) with individual bank systems, such as provider computing systems 110, to confirm fund availability in real-time. By interfacing with the exchange system 112, the central provider system 150 can issue confirmations or rejections based on current account balances, acting as a node within a larger network that facilitates financial transparency and operational efficiency. The central provider system 150 can utilize a series of API calls to retrieve data from banks' operating accounts and return a response indicating whether the necessary funds are present. In some implementations, the central provider system 150 might also log inquiries and responses for auditing purposes, maintaining a record of all interactions to comply with financial regulations.

The user computing system 140 can be structured or configured to interface with the provider computing systems 110 for transaction execution and financial management. That is, the user computing system 140 can include one or more processing circuits that can facilitate exchanges. Furthermore, the user computing system 140 can be as a client-side interface that facilities the interactions between users and their financial portfolios and banking services. The user computing system 140 can be implemented with software that facilitates secure financial transactions and personal finance management. In some implementations, the user computing system 140 may include tools for viewing account balances, transferring funds, paying bills, and investing in various financial products. The user computing system 140 is configured to facilitate secure and private messages and exchanges, incorporating end-to-end encryption for data transmission and multi-factor authentication to verify user identity before granting access to sensitive financial data. The user computing system 140 can connect (e.g., over network 130) to banking and financial services (e.g., offered by the provider computing system 110) using encrypted channels to perform transactions securely and efficiently. Additionally, the user computing system 140 can provide users with real-time notifications on transaction status and account alerts.

The wallet system 142 included in the user computing system 140 can be a digital wallet that facilitates the storage, sending, and receiving of monetary assets. It can support a diverse range of currencies, including digital currencies, and provide functionalities such as automatic currency conversion based on up-to-date exchange rates sourced from financial data feeds. The wallet system 142 may include features that facilitate the scheduling of payments, setting up of automatic transfers, and tracking of personal or business financial transactions. Within the user computing system 140, the wallet system 142 manages all digital asset transactions. In some implementations, the wallet system 142 of the recipient can be configured to securely receive and manage the funds (e.g., after processing by the provider computing system 110, such as once they are released from escrow). That is, the wallet system 142 can be a financial management platform or tool that can handle incoming transfers, payments, and other financial operations. For example, the wallet system 140 can integrate with other financial tools to provide the recipient with financial services. In some implementations, the wallet system 142 of the user computing system 140 can be a digital wallet for customers and entities to manage and receive exchanges. It can be integrated within the user computing system 140, providing an interface for viewing statuses of exchanges, initiating exchanges, and receiving payments. The wallet system 142 can be structured to include security features such as encryption and multi-factor authentication to protect investment transactions and data. In some implementations, the wallet system 142 can communicate with escrow wallet system 120, providing real-time synchronization of account data and updates of fund availability (e.g., before or after being flagged).

The data sources 160 can include external platforms or services that provide real-time or near-real-time data for the operation of verifying, flagging, and processing exchanges. These data sources can provide (or make available) a plurality of regulatory data, including controlling frameworks and corresponding controlling parameters, other laws or regulations, news or media, or other external data used to verify, flag, and/or process exchanges. Data sources 160 can be integrated through APIs that facilitate secure data retrieval. For example, data sources 160 may supply the one or more controlling parameters to the exchanges system 112 used to model an exchange package. For example, the data sources 160 (e.g., MySQL, NoSQL, in-memory databases, etc.) can be, but are not limited to, regulatory databases, financial market feeds, news aggregators, social media platforms, or proprietary data repositories. Queries to the data sources 160 could be executed through API requests, SQL queries, or specialized query languages customized to the specific data source, providing retrieval and processing of real-time or near-real-time data for verification, flagging, and exchange processing.

While the exchange system 112 described above with reference to being a recipient provider or an intermediary provider, it should be understood that the exchange system 112 can be a sender provider computing system (e.g., another provider computing system 110). In some implementations, the sender provider computing system may include similar features and functionalities as described above with reference to receiving an exchange, storing the exchange, modeling the exchange, signing or generating an exchange flag, embedding the exchange flag in the exchange, freezing the funds and routing the funds to an escrow wallet, monitoring the funds within the escrow wallet, and processing a controlled release. However, instead of receiving a signed exchange package, the sender provider computing system can receive an exchange request from a user computing system 140 (e.g., sender of funds) for an exchange of funds between the sender and the recipient. In some implementations, the exchange request may be signed by the wallet system 142 of the sender. Similarly to the recipient provider, the sender provider computing system can store the funds of exchange request into an operating account data structure of the sender provider (e.g., in provider database 122). Furthermore, the sender providing computing system can model the exchange request using a jurisdiction-specific controlling framework to verify the exchange request (e.g., when the exchange request satisfies a set of controlling parameters of the jurisdiction-specific controlling framework.

In some implementations, the sender providing computing system can model the exchange request using a jurisdiction-specific controlling framework to generate an exchange flag request (e.g., when a detection of a discrepancy in the signed exchange package or a regulatory restriction). Similarly, the sender provider computing system can access the set of controlling parameters of the controlling framework using data feeds of one or more access locations (e.g., data sources 160). Furthermore, if an exchange flag is generated, it can be embedded into the exchange request and the funds can be frozen based on routing the exchange request including the funds and the exchange flag from the operating account data structure to an escrow wallet of an escrow wallet system 120. In some implementations, the sender provider computing system can monitor the funds within the escrow wallet based on receiving or accessing additional data from at least one of the one or more data feeds of the plurality of access locations or directly form the user computing system 140 (e.g., request supplemental or additional information from the sender about the discrepancies). Moreover, the sender provider computing system process a controlled release of the funds from the escrow wallet to the recipient provider computing system, to the central provider system 150, or to the user computing system 140. For example, the controlled release to the recipient provider computing system can be based on satisfying the discrepancy in the exchange request or the regulatory restriction. In some implementations, processing the controlled release of funds to the recipient provider computing system can include signing the exchange request to create a signed exchange package.

As shown, the functionalities of the sender provider computing system and the recipient provider computing system, although parallel in many aspects, are distinguished primarily by their roles in the initiation and reception of transactions. The sender provider computing system initiates transactions by receiving exchange requests from user computing systems, such as wallet system 142 of a sender. It processes these requests by modeling them against a jurisdiction-specific controlling framework, verifying compliance with the regulatory parameters, and potentially generating and embedding exchange flags in transactions that exhibit discrepancies or regulatory concerns. In contrast, the recipient provider computing system can enhance efficiency by leveraging the approval status of transactions from a first jurisdiction (e.g., having stringent regulatory standards), to improve or expediate the modeling process for compliance in the second jurisdiction, where the recipient operates. This technical approach can include using the pre-approval of the transaction (e.g., signed by the sender provider computing system) under the stringent laws of the first jurisdiction as a benchmark for reducing the compliance checks in the second jurisdiction. Specifically, the recipient provider's system may not reevaluate all aspects of the transaction under its local laws but would instead only model on those aspects where the laws of the second jurisdiction diverge from or are more specific than those of the first jurisdiction. To implement this streamlined approach, the recipient provider's computing system (at the outset of modeling or prior to modeling) can differentiate and isolate only those regulations that are unique or stricter in the second jurisdiction compared to the first. For example, by comparing regulations (e.g., accessing various access points across jurisdictions) the exchange system 112 can identify and prioritize compliance checks based on the discrepancies between the two jurisdictions' laws. For example, if a transaction has already been cleared under the anti-money laundering regulations of the European Union, the recipient provider in a country with less stringent requirements might only need to perform additional checks for local regulations that are not covered by EU standards, such as specific national sanctions or additional reporting requirements. In another example, if a transaction clears stringent U.S. OFAC checks, it may be expedited through less stringent checks in another jurisdiction that shows deference to U.S. regulatory practices, thus speeding up the overall compliance process while maintaining a high standard of regulatory adherence. This selective approach allows the recipient provider to expedite the compliance process while ensuring adherence to all relevant local regulations.

Figure 2:
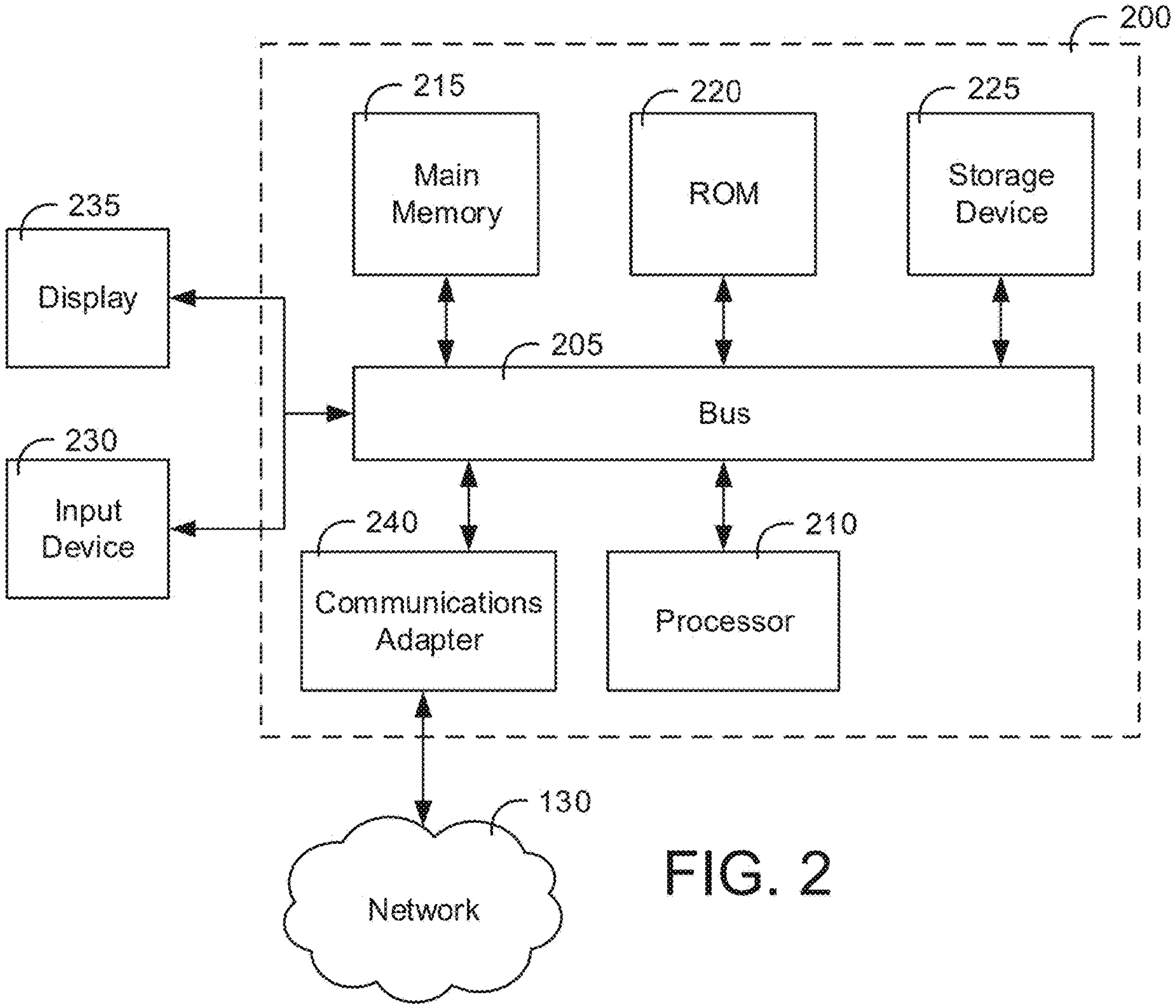
FIG. 2 depicts a block diagram illustrating an example computing system for use in the various implementations described herein.

Referring now to FIG. 2, a depiction of a computer system 200 is shown. The computer system 200 that can be used, for example, to implement a computing environment of FIG. 1A or 1B, the provider computing system 110, escrow wallet system 120, provider database 122, user computing system 140, central provider system 150, and data sources 160, and/or various other example systems described in the present disclosure. The computing system 200 includes a bus 205 or other communication component for communicating information and a processor 210 coupled to the bus 205 for processing information. The computing system 200 also includes main memory 215, such as a random-access memory (RAM) or other dynamic storage device, coupled to the bus 205 for storing information, and instructions to be executed by the processor 210. Main memory 215 can also be used for storing position information, temporary variables, or other intermediate information during execution of instructions by the processor 210. The computing system 200 may further include a read only memory (ROM) 220 or other static storage device coupled to the bus 205 for storing static information and instructions for the processor 210. A storage device 225, such as a solid-state device, magnetic disk or optical disk, is coupled to the bus 205 for persistently storing information and instructions.

The computing system 200 may be coupled via the bus 205 to a display 235, such as a liquid crystal display, or active matrix display, for displaying information to a user. An input device 230, such as a keyboard including alphanumeric and other keys, may be coupled to the bus 205 for communicating information, and command selections to the processor 210. In another arrangement, the input device 230 has a touch screen display 235. The input device 230 can include any type of biometric sensor, a cursor control, such as a mouse, a trackball, or cursor direction keys, for communicating direction information and command selections to the processor 210 and for controlling cursor movement on the display 235.

In some arrangements, the computing system 200 may include a communications adapter 240, such as a networking adapter. Communications adapter 240 may be coupled to bus 205 and may be configured to provide communications with a computing or communications network 245 (similar features and functionality as network 103) and/or other computing systems. In various illustrative arrangements, any type of networking configuration may be achieved using communications adapter 240, such as wired (e.g., via Ethernet), wireless (e.g., via Wi-Fi, Bluetooth), satellite (e.g., via GPS) pre-configured, ad-hoc, LAN, WAN.

According to various arrangements, the processes that effectuate illustrative arrangements that are described herein can be achieved by the computing system 200 in response to the processor 210 executing an arrangement of instructions contained in main memory 215. Such instructions can be read into main memory 215 from another computer-readable medium, such as the storage device 225. Execution of the arrangement of instructions contained in main memory 215 causes the computing system 200 to perform the illustrative processes described herein. One or more processors in a multi-processing arrangement may also be employed to execute the instructions contained in main memory 215. In alternative arrangements, hard-wired circuitry may be used in place of or in combination with software instructions to implement illustrative arrangements. Thus, arrangements are not limited to any specific combination of hardware circuitry and software.

That is, although an example processing system has been described in FIG. 2, arrangements of the subject matter and the functional operations described in this specification can be carried out using other types of digital electronic circuitry, or in computer software (e.g., application, blockchain, distributed ledger technology) embodied on a tangible medium, firmware, or hardware, including the structures disclosed in this specification and their structural equivalents, or in combinations of one or more of them. Arrangements of the subject matter described in this specification can be implemented as one or more computer programs, e.g., one or more subsystems of computer program instructions, encoded on one or more computer storage medium for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

Although shown in the arrangements of FIG. 2 as singular, stand-alone devices, one of ordinary skill in the art will appreciate that, in some arrangements, the computing system 200 may include virtualized systems and/or system resources. For example, in some arrangements, the computing system 200 may be a virtual switch, virtual router, virtual host, virtual server. In various arrangements, computing system 200 may share physical storage, hardware, and other resources with other virtual machines. In some arrangements, virtual resources of the network may include cloud computing resources such that a virtual resource may rely on distributed processing across more than one physical processor, distributed memory, etc.

Figure 3:
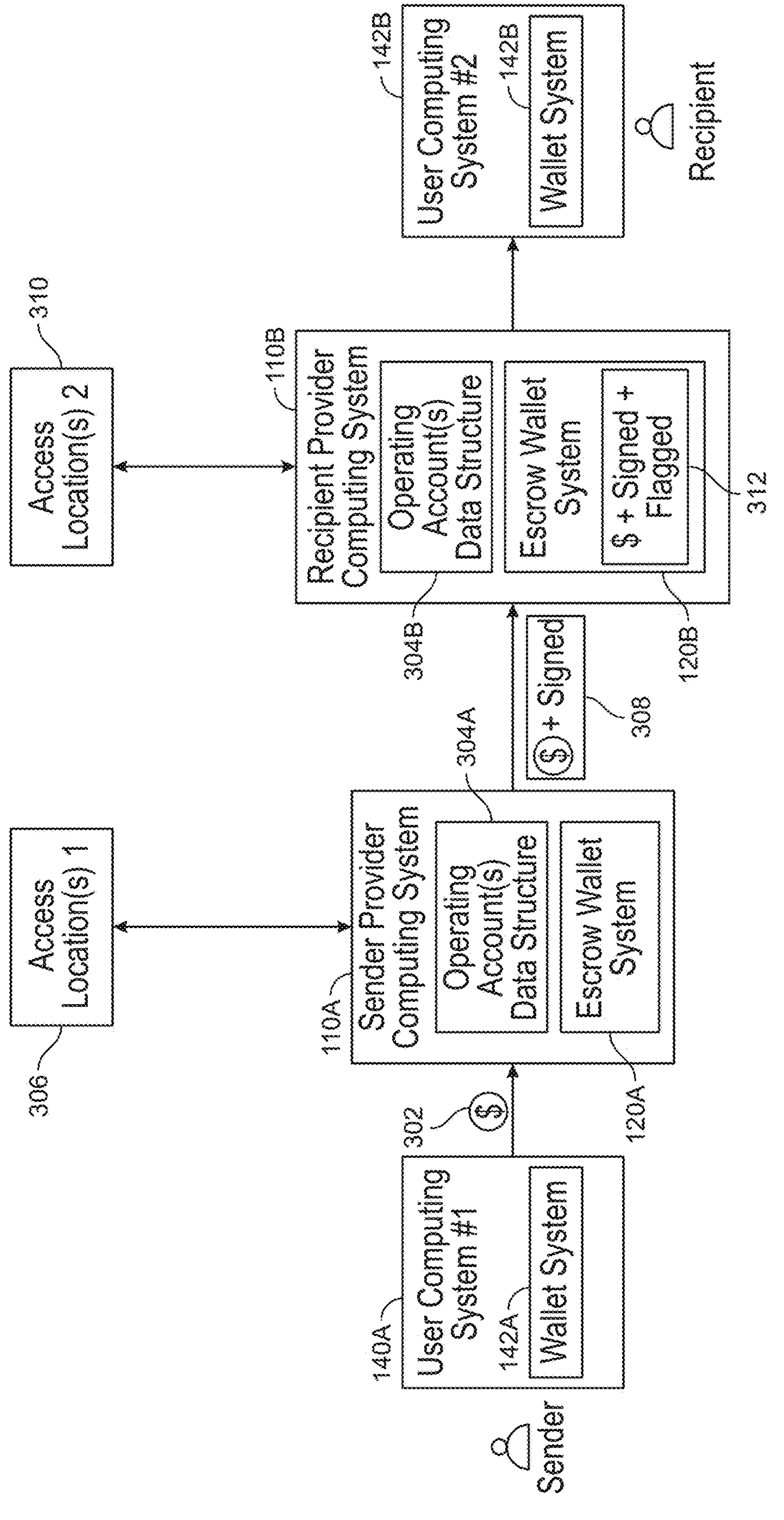
FIG. 3 depicts an example exchange architecture, according to some implementations.

Referring now to FIG. 3, depicting an example exchange architecture, according to some implementations. Generally, compliance with OFAC regulations and jurisdiction-specific laws can be important, where each transaction should be scrutinized for adherence to these standards. Transactions, defined as the exchange of funds between a sender provider and a recipient provider, can be facilitated through signed exchange packages. These packages are data packets that contain the funds and include the sender bank's signature, allowing for verified fund transfers across banking systems. For example, if a transaction initiated by a sender from a non-US bank is flagged during the FED settlement process, the funds may be diverted to an escrow wallet rather than proceeding directly to the recipient. This action can prevent potentially fraudulent transactions from completing, safeguarding both the banking institutions and their clients. Moreover, the example exchange architecture can support the use of smart contracts to automate and secure transactions further. The smart contracts can be programmed to perform jurisdictional checks to verify or determine whether funds should remain in escrow or be released to the recipient, based on compliance with the programmed regulatory requirements. Additionally, if the recipient's bank flags a transaction due to an unresolved sanction hit, the funds can remain in the escrow wallet, be returned to the sender, or in severe cases, be confiscated by regulatory authorities. The controlled release mechanism can verify that funds are only transferred when all compliance criteria are satisfactorily met.

Furthermore, the example exchange architecture can also incorporate a level of programmability and real-time monitoring, which improves efficiency and compliance capabilities. Each jurisdiction involved in the transactional process can program its specific rules into the system. This programming facilitates a customized approach to regulatory compliance that respects both local laws and international agreements. In some implementations, the example exchange architecture can use dynamic oracles which can provide continuous updates on regulatory changes, sanction lists, and other relevant information. Moreover, the example exchange architecture can also include a digital dashboard that provides transparency across the transaction process. The dashboard can provide all parties involved—from banks to regulatory bodies—to monitor the status of transactions in real-time. It can display details such as the current location of funds, compliance status, and any discrepancies or flags that might affect the transaction. In addition to regulatory compliance, the example exchange architecture can consider the logistical aspects of handling flagged transactions. For example, when a transaction is flagged due to a missing element, such as an incorrect address, the funds are held in the escrow wallet until the discrepancy is resolved. If the issue is not resolved within a set time frame, the funds may either be returned to the sender or, depending on the nature of the discrepancy, be subject to further investigation or forfeiture. In some implementations, the example exchange architecture can be implemented to also provide the accrual of interest on funds held within the escrow accounts. The interest accrued can be allocated according to agreements made between the involved parties, providing an incentive for maintaining funds in escrow only as long as absolutely necessary. In some implementations, the example exchange architecture can support bi-temporality through hashing techniques, which can record the state of data at any given time. It can capture the entire history of the transaction, including what was in question, why it was held, and for how long, enhancing the auditability and accountability of the transaction process.

Referring to FIG. 3 in greater detail, the example exchange architecture can include a sender initiating a transfer or exchange using a wallet system 142A of a user computing system 140A. The exchange request 302 can be sent to a sender provider computing system 110A. The sender provider computing system 110A can store the exchange request in an operating account data structure 304A for modeling. During modeling access locations 306 (e.g., oracles or other external data feeds) can be accessed to obtain controlling parameters of a controlling framework. The controlling parameters of the controlling framework may be jurisdiction-specific (e.g., United States terrorist list, sanctioned list, OFAC, jurisdiction banking laws, bank-specific transaction rules, etc.). The modeling can include generating an exchange flag or verifying the exchange. For example, a flag may be generated when there is a detection of a discrepancy in the exchange request 302 or a regulatory restriction. In another example, the exchange may be verified and sent to the recipient provider computing system 110B as a signed exchange package 308.

In some implementations, the sender provider computing system 110A can generate an exchange flag, embed the exchange flag into the exchange request, and route the exchange to escrow wallet system 120A. However, when or after the exchange request is verified, the sender provider computing system 110A can sign the exchange request using digital signatures (e.g., hashing the exchange request and encrypting the hash with a private key or secret key-using a protocol such as RSA). In some implementations, the sender provider computing system 110A can interface with a central provider system 150 to receive a verification of adequate funds. Signing the exchange request creates a signed exchange package 308 that can be sent to the recipient provider computing system 110B. Additionally, prior to sending the funds or asset to the recipient, the recipient provider computing system 110B may store the signed exchange request 308 in an operating account data structure 304B of the recipient provider computing system 110B.

In some implementations, the recipient provider computing system 110B can then model the signed exchange package using a jurisdiction-specific controlling framework (e.g., Japan terrorist list, sanctioned list, jurisdiction banking laws, bank-specific transaction rules, etc.) corresponding with a set of controlling parameters accessed from access locations 310. In modeling, the recipient provider computing system 110B can generate an exchange flag and embed the exchange flag into the signed exchange package (e.g., received from the sender provider computing system 110A). For example, when the exchange flag is embedded the funds of the exchange can be frozen by routing the signed exchange package to the escrow wallet system 120B. As shown, the signed-flagged exchange package 312 can be stored in an escrow wallet of the escrow wallet system 120B. That is, the recipient may not receive the flagged funds unless the discrepancies in the signed exchange package or the regulatory restriction can be satisfied. In some implementations, if a specified time period elapses while the funds are in an escrow wallet or if discrepancies in the signed exchange package or regulatory restrictions are not resolved, the sender provider computing system 110A may receive the returned funds. In some implementations, the funds may be confiscated and sent to a central provider system 150 (e.g., government or regulatory body). In some implementations, if the exchange is verified without generating an exchange flag or after an exchange flag is generated but remediated or satisfied, the recipient provider computing system can provide the funds to a wallet system 142B of a user computing system 140B of a recipient.

As shown, a sender can operate a user computing system 140A that can include a wallet system 142A. The sender may use the wallet system 142A to initiate a transfer of currency to a recipient. For example, the sender initiates a transaction by sending an exchange request from their wallet system 142A. In some implementations, exchange request 302 (e.g., exchange package including an exchange amount) may be sent from the wallet system 142A to the sender provider computing system 110A. The exchange package may include a currency amount, a type of currency, the recipient, transaction details, and transaction metadata which could include compliance data. For example, a currency may be sent by the sender based on the recipient's requirements and jurisdictional regulations. In some implementations, the exchange request 302 may be a data packet requesting the sender provider, which maintains the account of the sender, to initiate an exchange from exchange request 302 in an amount. For example, the amount requested for transfer is calculated based on the current exchange rate provided through access locations. The sender computing system 110A can store the funds for transfer in an operating account data structure 304A. For example, operating account data structure 304A can be configured to segregate different types of funds based on currency, transaction type, or compliance requirement. In some implementations, the sender computing system 110A can model the exchange package to determine compliance with OFAC regulations using the set of controlling parameters. In some implementations, modeling the exchange package may include generating an exchange flag based on a set of controlling parameters of a controlling framework accessed from one or more data feeds of a plurality of access locations 306. That is, modeling can generate an exchange flag or can result in a verification of the exchange which can be signed and provided as a signed exchange package 308 to the recipient provider computing system 110B. However, when an exchange flag is generated the exchange flag can be embedded into the exchange request 302 and routed to an escrow wallet of the escrow wallet system 120A.

In some implementations, the sender provider computing system 110A can monitor the funds within the escrow wallet based on receiving or accessing additional data from at least one of the one or more data feeds of the plurality of access locations 306 or the user computing system 140A. For example, the sender provider computing system 110A may receive updates about regulatory changes that impact the transaction. A controlled release can occur by the sender provider computing system 110A. In some implementations, the controlled release can include signing and providing the signed exchange package 308 to the recipient provider computing system. For example, this may occur based on satisfying the discrepancy in the signed exchange package or the regulatory restriction. However, in some implementations, the funds may be confiscated or provided back to the user computing system 140A based on the time period of the funds being in the escrow wallet or failing to satisfy the discrepancy in the signed exchange package or the regulatory restriction. For example, funds may be returned to the sender if discrepancies are not resolved within the regulatory time frame. In another example, funds could be redirected to regulatory authorities if involved in non-compliance issues.

Further as shown, if the recipient provider computing system 110B receives the signed exchange package 308, the signed exchange package 308 may be stored in the operating account data structure 304B for modeling. On the recipient provider computing system 110B, the modeling can be to a different controlling framework with a different set of controlling parameters that is jurisdiction-specific to the recipient provider computing system 110B. For example, the recipient system might apply local banking laws to the transaction review process. In another example, the recipient system might adjust transaction parameters based on the compliance status. During modeling one or more exchange flags may be generated after analyzing the data of the signed exchange package and checking for compliance breaches. That is, a set of controlling parameters of a controlling framework can be accessed from one or more data feeds of a plurality of access locations 310. Furthermore, the exchange flag can be generated based on a detection of a discrepancy in the signed exchange package or a regulatory restriction. For example, while the sender provider computing system 110A may verify the transaction, the signed exchange package 308 may not be verified by the recipient provider computing system 110B when the transaction does not meet the specific compliance requirements of the recipient's jurisdiction. In this example, the recipient provider computing system 110B may delay or prevent the finalization of the transaction pending further review or necessary corrections. That is, when an exchange is flagged, it may be saved as a signed-flagged exchange package 312 into an escrow wallet of the escrow wallet system 120B. For example, the funds can be frozen by routing the signed exchange package including the funds and the exchange flag from the operating account data structure 304B to an escrow wallet of an escrow wallet system 120B of the recipient provider. For example, this escrow account holds the funds until all regulatory concerns are clarified or resolved, ensuring compliance before final disbursement.

In some implementations, the recipient provider computing system 110B can monitor the funds within the escrow wallet based on receiving or accessing additional data from the access location 310 or the sender provider computing system 110A. For example, data may be received from the access locations 310 that includes updates on regulatory changes, compliance alerts, or sanction lists that affect the transaction's compliance status. In another example, data may be accessed on the sender provider computing system 110A such as details on the initial transaction parameters or updates on the sender's compliance status. Accordingly, the recipient provider computing system 110B may process a controlled release of the funds from the escrow wallet to the wallet system 142B of the user computing system 140B of the recipient, to the sender provider computing system 110A, or a central provider system 150. A controlled release to the wallet system 142B may be based on satisfying the discrepancy in the signed exchange package or the regulatory restriction. For example, funds may be released to the recipient once all compliance checks are verified and no discrepancies remain. A controlled release to the sender provider computing system 110A or the central provider system 150 (not shown, but a bi-directional arrow could be shown from both 110A to 110B to the central provider system 150 as shown with reference to FIG. 1) may be based on a time period of the funds being in the escrow wallet or failing to satisfy the discrepancy in the signed exchange package or the regulatory restriction. For example, funds could be returned to the sender if the issues are not resolved, or they may be forfeited to regulatory authorities in case of severe compliance violations. In another example, this could include further legal proceedings if funds are associated with criminal activities. Accordingly, the example exchange architecture provides various technical improvements to provide regulatory compliance and secure transaction processing across different jurisdictions.

Figure 4:
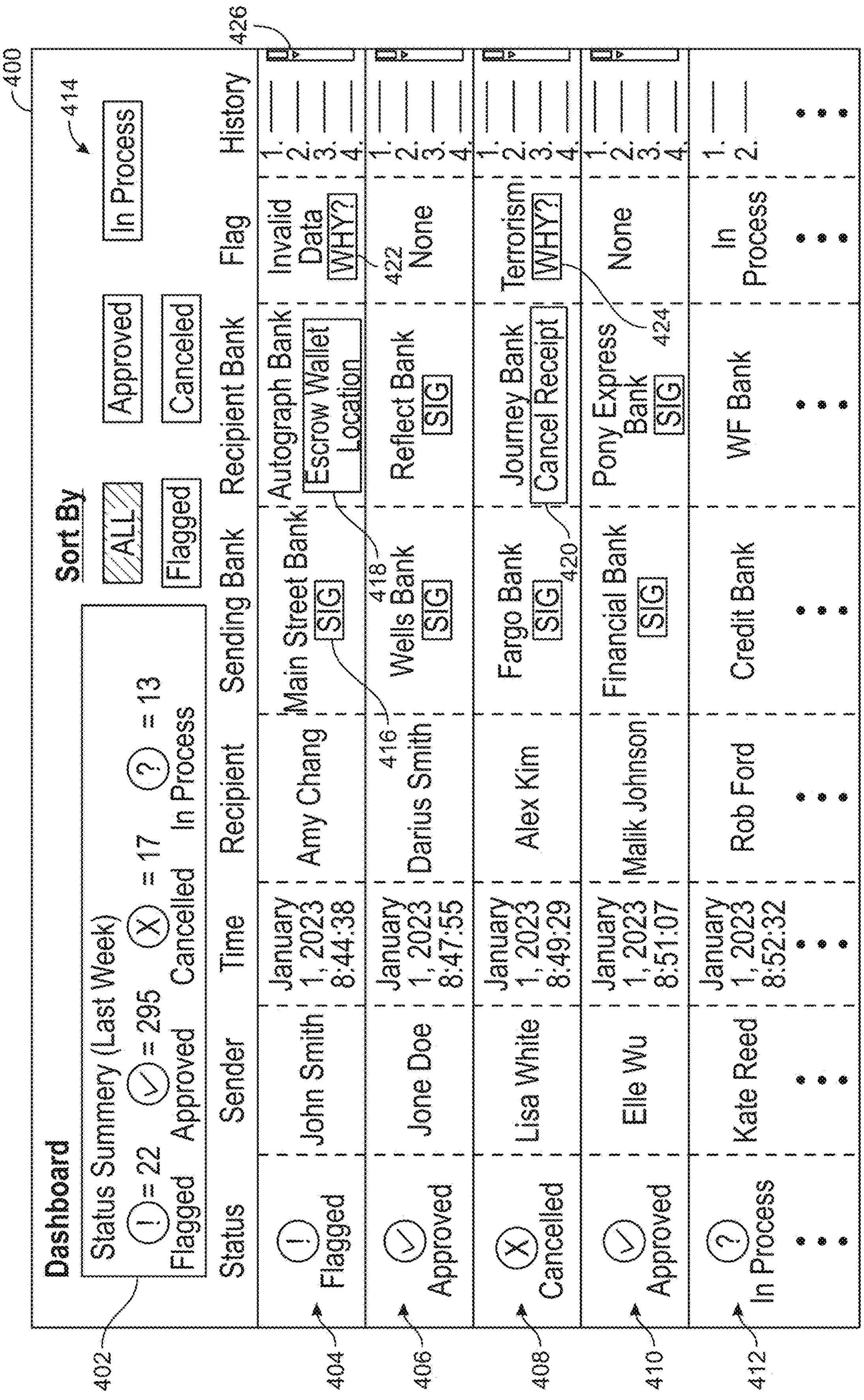
FIG. 4 depicts a block diagram of a graphical user interface of a dashboard, according to some implementations.

Referring now to FIG. 4, a block diagram of a graphical user interface of a dashboard, according to some implementations. As shown, dashboard 400 can be a graphical user interface structured or configured to be presented on viewport or display of the provider computing system 110. The dashboard can include various content and real-time information regarding a compliance status of the exchange of funds, a location of the funds, and the discrepancy in the signed exchange package or the regulatory restriction. For example, the compliance status summary element 402 may include real-time information (e.g., last week) about flagged, approved, canceled, and in process exchange requests. Additionally, various selectable elements 414 may be selected to sort dashboard 400 according to statutes (e.g., "Pending" or "In Process", "Cleared" or "Approved", "Flagged", or "Canceled"). In another example, the location of the funds may be shown along with maps or graphical indicators of banks involved in the transaction. In yet another example, the discrepancy in the signed exchange package could include mismatches in amounts or recipient details. In yet another example, the discrepancy in the regulatory restriction may be an active alert for funds linked to sanctioned entities.

The dashboard 400 may include interactable elements and content for reviewing by the recipient bank or sender bank. For example, the dashboard 400 may include signature buttons (e.g., signature button 416) that can be selected to facilitate the review of one or more signatures of the sending or recipient bank. Upon selecting signature button 416 the dashboard 400 may present detailed signature validation results. In another example, the dashboard 400 may include escrow wallet location buttons (e.g., escrow wallet location button 418) that can be selected to facilitate the auditing process. Upon selecting escrow wallet location button 418 the dashboard 400 may present detailed transaction paths and current status of the funds. In some implementations, the dashboard 400 can include a status summary for the financial institution to view flagged, approved, canceled, and in process exchanges occurring at the particular financial institution. As shown, flagged transaction 404, between John Smith and Amy Chang, may have been signed by Main Street Bank (e.g., verified) but may have been flagged by Autograph Bank, where an escrow wallet location button 418 can be presented to provide the bank or another user to further review. Additionally, the flagged transaction 404 can include a flag type (e.g., invalid data) with why button 422 that can be selected in dashboard 400 to reveal detailed explanations or audit details that clarify the reasons behind the flagging, providing transparency and actionable insights for compliance officers or bank officials. Additionally, the flagged transaction 404 can include a time the transaction was initiated (e.g., Jan. 1, 2023, at 8:44:38) and a historical log that can be viewed using scroller 426.

In another example, approved transaction 406 may include signature buttons for both the sending bank and recipient bank such that each party can independently verify and acknowledge the transaction's approval status directly within dashboard 400. In yet another example, the canceled transaction 408 may include a cancel receipt button 420 that can be selected to generate and download a formal cancellation receipt, documenting the transaction cancellation for record-keeping and compliance purposes. Additionally, the flag type for the canceled transaction 408 may be a terrorism flag and the why button 424 may be selected to provide specific details about the underlying reasons for the transaction's cancellation, such as links to terrorism financing or breaches of international sanctions. In this example, a cancellation of an exchange may return the funds to the sender (e.g., Lisa White) but the funds may also be transferred to a central provider when the cancellation is mandated by regulatory bodies or when the flagged issues cannot be resolved within a stipulated timeframe. In yet another example, approved transaction 410 may also include signature buttons for both the sending and recipient bank to allow both banks to execute mutual verification and confirm the transaction's validity and compliance through a secure digital process. In yet another example, in process transaction 412 may be updated in real-time as the exchange is processed. In this example, when the sending bank (e.g., Credit Bank) models and either generates a flag or signs the exchange the dashboard 400 can be updated. That is, the dashboard can dynamically display the updated status, providing parties to monitor the progression of the transaction and intervene if necessary.

Figure 5:
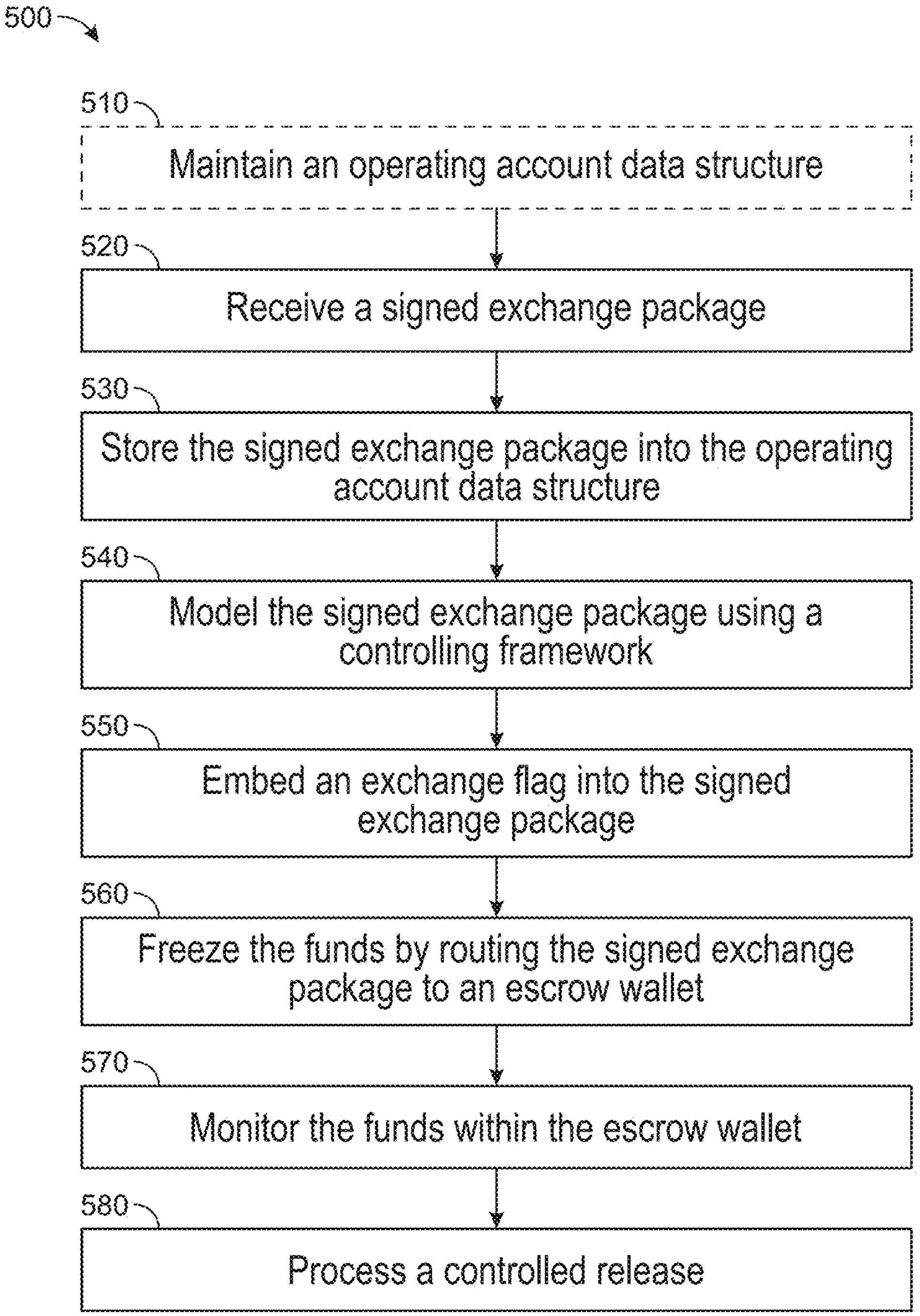
FIG. 5 depicts a method for modeling exchanges, according to some implementations.

Referring now to FIG. 5, depicting a method for exchange modeling, according to some implementations. At least one of the example system of FIG. 1 or the example exchange architecture 300, can perform method 500 according to present implementations.

In broad overview of method 500, at block 510, the one or more processing circuits (e.g., provider computing system 110, specifically the exchange system 112) can maintain an operating account data structure. At block 520, the processing circuits receive a signed exchange package. At block 530, the processing circuits can store the signed exchange package into the operating account data structure. At block 540, the processing circuits can model the signed exchange package using a controlling framework. At block 550, the processing circuits can embed an exchange flag into the signed exchange package. At block 560, the processing circuits can freeze the funds by routing the signed exchange package to an escrow wallet. At block 570, the processing circuits can monitor the funds within the escrow wallet. At block 580, the processing circuits can process a controlled release. Additional, fewer, or different operations may be performed depending on the particular implementation. For example, block 510, 530, and 550 may be skipped or otherwise be incorporated into the other blocks of method 500. In some implementations, some, or all operations of method 500 may be performed by processing circuits executing on one or more computing devices, systems, or servers. In various implementations, each operation may be re-ordered, added, removed, or repeated. Additionally, some or all of the operations performed by the blocks may be removed or added based on the provider performing the steps.

At block 510, the processing circuits can maintain an operating account data structure including a plurality of funds of a recipient provider. For example, the operating account could segregate funds into accounts at the provider (e.g., bank or financial institution) and could further segregate funds that are stored or in process. In some implementations, maintaining the operating account data structure can include storing the plurality of funds under a first controlling framework corresponding with a first set of controlling parameters. That is, the operating account data structure can be an exchange ledger that stores funds designated for processing, the operating account data structure maintains a record of deposits, withdrawals, and exchanges. For example, the structure could support the tracking of funds in real-time. Furthermore, the operating account data structure can be used to log each transaction detail such as date, amount, recipient details, payment method, compliance flags, and involved parties to provide financial compliance and record-keeping. For example, this log can be used as an audit trail for regulatory review or internal checks.

At block 520, the processing circuits can receive, from a sender provider computing system, a signed exchange package for an exchange of funds between a sender of a sender provider and a recipient of the recipient provider. For example, the package may include transaction metadata to facilitate compliance checks and fund tracking. In some implementations, the signed exchange package can be signed based on satisfying a second set of controlling parameters of a second controlling framework of the sender provider. For example, the sender provider computing system of jurisdiction X may use modeling to verify the funds and then sign the package, reflecting compliance with jurisdiction regulations and having no discrepancies for processing. Additionally, the signed exchange package can be signed using a digital signature authenticated using a cryptographic method. For example, an exchange request may be signed by the sender provider computing system using RSA encryption. In another example, an exchange request may be signed by the sender provider computing system using ECC (Elliptic Curve Cryptography). In some implementations, the signed exchange package can be further signed based on satisfying a third set of controlling parameters of a central provider of the second jurisdiction. For example, a central provider may verify fund available at the sender provider computing system. In this example, the third set of controlling parameters may be related to liquidity requirements and risk assessments.

At block 530, the processing circuits can store the signed exchange package including the funds of the signed exchange package into the operating account data structure. For example, storing can include categorizing the transaction by type and priority, facilitating faster processing for high-priority transactions. For example, transaction logs may be automatically updated to reflect the new entry. Furthermore, the operating account data structure may apply encryption to the stored data. In some implementations, the signed exchange package may be automatically modeled within storing. That is, validation checks can be performed to confirm adherence to the transaction terms and controlling frameworks.

At block 540, the processing circuits can model the signed exchange package using the first controlling framework to generate an exchange flag. In some implementations, the first set of controlling parameters of the first controlling framework can be accessed from one or more data feeds of a plurality of access locations. Furthermore, the exchange flag can be generated based on a detection of a discrepancy in the signed exchange package or a regulatory restriction. Generally, modeling can include evaluating or analyzing the exchange request or signed exchange package and applying regulatory compliance checks to verify the transaction meets all required standards. In some implementations, modeling can include executing one or more smart contracts including executable code to verify compliance of the exchange of funds with the first controlling framework. That is, smart contracts can be used to automatically enforce terms and conditions of the exchange as per the underlying legal and regulatory requirements. For example, the one or more smart contracts can automatically generate the exchange flag, embed the exchange flag into the signed exchange package, and freeze the funds by routing the signed exchange package to the escrow wallet (described below with reference to blocks 550-560). For example, the smart contracts can include executable code that can trigger specific actions based on predefined conditions such as delays in fund clearance or discrepancies in recipient credentials. For example, the executable code may be programmed to update all parties involved via automated notifications when conditions are triggered.

In some implementations, the first controlling framework and the second controlling framework can be jurisdiction-specific. For example, the first controlling framework can correspond to a first jurisdiction and the second controlling framework can correspond to a second jurisdiction. For example, the first controlling framework may apply regulations and laws of country X and the second controlling framework may apply regulations and laws of country Y. Additionally, the first set of controlling parameters of the first controlling framework can include at least one controlling parameter different from the second set of controlling parameters of the second controlling framework. For example, the first set of controlling parameters may include jurisdiction-specific laws and regulations such as anti-money laundering checks that are more stringent than those in the second jurisdiction. In another example, the second set of controlling parameters may include jurisdiction-specific laws and regulations such as banking regulations that are more comprehensive than those in the first jurisdiction.

In some implementations, the processing circuits can determine a first access location of the plurality of access locations of the one or more data feeds corresponding to primary regulatory data sources. For example, the primary regulatory data source may be a government-operated compliance database. Furthermore, the processing circuits can determine a second access location of the plurality of access locations of the one or more data feeds corresponding to secondary regulatory data sources. For example, the secondary regulatory data source may be an international trade monitoring platform. That is, the primary regulatory data sources can include jurisdiction-specific data, and the secondary regulatory data sources can include jurisdiction-agnostic data. For example, jurisdiction-specific data may be specific to financial transactions within country X, such as local tax laws. In another example, jurisdiction-agnostic data may be related to global sanctions lists maintained by international bodies. In some implementations, the processing circuits can update the first controlling framework based on receiving or accessing the additional data from the first access location or the second access location. For example, updates may be integrated into the exchange to reflect changes in sanctions lists or regulatory requirements immediately.

At block 550, the processing circuits can embed the exchange flag into the signed exchange package. In some implementations, embedding can include applying digital markers that link the flag to the transaction's data fields within the package. That is, the signed exchange package can be modified or updated by incorporating the flag as part of the transaction metadata, which can then be verified against existing records for consistency and compliance. For example, the processing circuits can automate this embedding process to confirm that all flagged transactions are immediately recognizable and processed according to specified controlling frameworks. In another example, the modification might include the addition of a timestamp and model ID related to the type of model which modeled and flagged the transaction. In some implementations, the exchange flag may be automatically embedded in the modeling step. That is, as soon as a discrepancy is identified and a flag is generated, the processing circuits can automatically embed this flag within the package to prevent any further processing steps without proper scrutiny.

At block 560, the processing circuits can freeze the funds by routing the signed exchange package including the funds and the exchange flag from the operating account data structure to an escrow wallet of an escrow wallet system of the recipient provider. In some implementations, the escrow wallet system can freeze the plurality of funds by restricting exchanges using exchange security restrictions preventing fund disbursement. For example, the processing circuits may use specific criteria such as the nature of the flag or the amount involved to determine the level of restriction imposed on the transaction. In some implementations, the escrow wallet system can include a plurality of escrow accounts. That is, the escrow accounts may be jurisdiction specific but for sorting exchanges into categories (e.g., based on amounts, based on type of flag, etc.). Furthermore, routing the signed exchange package to the escrow wallet can further be based on a type of exchange flag from a plurality of types of exchange flags. For example, the plurality of types of exchange flags can include terrorism detection, non-compliant exchange detection, regulatory detection, or office of foreign assets control (OFAC) detection. In this example, a terrorism detection flag could indicate an urgent review is required by specialized compliance officers. Further in this example, a non-compliant exchange detection flag could indicate additional documentation is needed to proceed. Further in this example, a regulatory detection flag could indicate a possible violation of international trade laws. Further in this example, an office of foreign assets control (OFAC) detection flag could indicate the transaction involves entities or countries under trade sanctions.

At block 570, the processing circuits can monitor the funds within the escrow wallet based on receiving or accessing additional data from at least one of the one or more data feeds of the plurality of access locations or the sender provider computing system. In some implementations, monitoring can include tracking the status of the funds and any changes in the regulatory environment that might affect the transaction. That is, the access locations can be oracles that provide real-time updates on changes in law or policy that impact the status of the funds. For example, the processing circuits may alert the involved parties if a previously non-sanctioned entity becomes sanctioned, necessitating immediate action regarding the funds currently held in escrow.

At block 580, the processing circuits can process a controlled release of the funds from the escrow wallet to a wallet system of the recipient, to the sender provider computing system, or a central provider system. For example, the release might be contingent upon verification that all regulatory concerns have been satisfactorily addressed and all discrepancies resolved. In some implementations, the controlled release to the wallet system can be based on satisfying the discrepancy in the signed exchange package or the regulatory restriction. For example, if discrepancies related to transaction amounts are resolved by the submission of additional supporting documentation, the funds may be released to the intended recipient. In some implementations, the controlled release to the sender provider computing system or the central provider system can be based on a time period of the funds being in the escrow wallet or failing to satisfy the discrepancy in the signed exchange package or the regulatory restriction. For example, if the regulatory issues are not resolved within a predetermined time frame, the funds may be returned to the sender to prevent prolonged financial uncertainty. Furthermore, processing the controlled release of the funds to the central provider system can correspond to a forfeiture of the funds to a government entity regulating the recipient provider. That is, if the transaction involves illegal activities, the funds may be forfeited as part of legal actions taken by regulatory authorities. Additionally, processing the controlled release of the funds to the sender provider computing system can correspond to a return of the funds to the sender provider. For example, this could occur if the transaction fails final compliance checks, necessitating the return of funds to the original sender for corrective action.

In some implementations, the processing circuits of method 500 can be nodes of a distributed ledger. That is, the processing circuits can store the one or more smart contracts on the distributed ledger and execute the one or more smart contracts by verifying compliance with the first controlling framework and updating a compliance status or a compliance result on the distributed ledger. In some implementations, the one or more smart contracts can automate much of the compliance and regulatory monitoring process, reducing the need for manual oversight and speeding up the transaction lifecycle. For example, smart contracts could automatically manage the escalation process when discrepancies are detected.

In some implementations, the processing circuits can generate a compliance report including information supporting one or more reasons for routing of the funds to the escrow wallet. For example, the report may detail the specific regulatory flags raised and the actions taken in response to each, providing a view of the compliance process for audit purposes. Furthermore, the processing circuits can generate and present a graphical user interface (GUI) dashboard including real-time information regarding a compliance status. That is, the dashboard can dynamically update to reflect the latest data on fund status and compliance status. For example, the compliance status may be of the exchange of funds, a location of the funds, and/or the discrepancy in the signed exchange package or the regulatory restriction. In this example, the exchange of funds may be displayed with details on the flow of funds and any holds or releases enacted. Further in this example, the location of the funds may be visualized on a map or schematic showing the flow between banks and escrow accounts. Further in this example, the discrepancy in the signed exchange package may be detailed with specific information about the nature of the discrepancy and steps taken to address it. Further in this example, the regulatory restriction may be outlined with information on the specific regulations involved and the compliance actions required.

In some implementations, in response to processing the controlled release, the processing circuits can determine an interest amount based on a duration the funds were frozen in the escrow wallet. For example, interest calculations may be based on standard banking rates or specific contractual agreements between the parties involved. Furthermore, the processing circuits can process one or more interest payments to at least one of the sender provider, the recipient provider, the sender, or the recipient. That is, the distribution of interest payments may be governed by the terms of the escrow agreement, ensuring that parties are compensated for the time their funds were held.

The implementations described herein have been described with reference to drawings. The drawings illustrate certain details of specific implementations that implement the systems, methods and programs described herein. However, describing the implementations with drawings should not be construed as imposing on the disclosure any limitations that may be present in the drawings.

It should be understood that no claim element herein is to be construed under the provisions of 35 U.S.C. § 112 (f) unless the element is expressly recited using the phrase "means for."

As used herein, the term "circuit" may include hardware structured to execute the functions described herein. In some implementations, each respective "circuit" may include software for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

Accordingly, the "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may include or otherwise share the same processor which, in some example implementations, may execute instructions stored, or otherwise accessed, via different areas of memory). Alternatively or additionally, the one or more processors may be structured to perform or otherwise execute certain operations independent of one or more co-processors. In other example implementations, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some implementations, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the implementations might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some implementations, the non-volatile media may take the form of ROM, flash memory (e.g., flash memory such as NAND, 3D NAND, NOR, 3D NOR), EEPROM, MRAM, magnetic storage, hard discs, optical discs, etc. In other implementations, the volatile storage media may take the form of RAM, TRAM, ZRAM, etc. Combinations of the above are also included within the scope of machine-readable media. In this regard, machine-executable instructions include, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes and omissions may be made in the design, operating conditions and implementation of the implementations without departing from the scope of the present disclosure as expressed in the appended claims.

What is claimed is:

1. A method of modeling exchanges, the method comprising:

maintaining, by one or more processing circuits, an operating account data structure comprising a plurality of funds of a recipient provider, wherein maintaining the operating account data structure comprises storing the plurality of funds under a first controlling framework corresponding with a first set of controlling parameters;

receiving, by the one or more processing circuits from a sender provider computing system, a signed exchange package for an exchange of funds between a sender of a sender provider and a recipient of the recipient provider, wherein the signed exchange package is signed based on satisfying a second set of controlling parameters of a second controlling framework of the sender provider;

storing, by the one or more processing circuits, the signed exchange package comprising the funds of the signed exchange package into the operating account data structure;

modeling, by the one or more processing circuits, the signed exchange package using the first controlling framework to generate an exchange flag, wherein the modeling comprises executing one or more smart contracts comprising executable code to verify compliance of the exchange of funds with the first controlling framework, wherein the first set of controlling parameters of the first controlling framework are accessed from one or more data feeds of a plurality of access locations, wherein the exchange flag is generated based on a detection of a discrepancy in the signed exchange package or a regulatory restriction, wherein the one or more data feeds comprise at least one primary API connection to at least one primary data source and at least one second API connection to at least one secondary data source;

embedding, by the one or more processing circuits, the exchange flag into the signed exchange package as metadata of the signed exchange package and cryptographically protecting the exchange flag and the metadata;

freezing, by the one or more processing circuits, the funds by routing the signed exchange package comprising the funds and the exchange flag from the operating account data structure to an escrow wallet of an escrow wallet system of the recipient provider;

generating and presenting, by the one or more processing circuits, a graphical user interface (GUI) dashboard that comprises real-time information regarding a compliance status of the exchange of funds, a location of the funds, and the discrepancy in the signed exchange package or the regulatory restriction, the GUI dashboard further comprising at least one selectable element corresponding to the compliance status;

monitoring, by the one or more processing circuits, the funds within the escrow wallet based on receiving or accessing additional data from at least one of the one or more data feeds of the plurality of access locations or the sender provider computing system; and processing, by the one or more processing circuits, a controlled release of the funds from the escrow wallet to a wallet system of the recipient, to the sender provider computing system, or a central provider system, wherein the controlled release to the wallet system is based on satisfying the discrepancy in the signed exchange package or the regulatory restriction, and wherein the controlled release to the sender provider computing system or the central provider system is based on a time period of the funds being in the escrow wallet or failing to satisfy the discrepancy in the signed exchange package or the regulatory restriction, and wherein processing the controlled release further comprises determining an interest amount based on a duration the funds were frozen in the escrow wallet, the interest amount to be applied to at least one of the sender provider, the recipient provider, the sender, or the recipient.

2. The method of claim 1, wherein the first controlling framework and the second controlling framework are jurisdiction-specific, the first controlling framework corresponding to a first jurisdiction and the second controlling framework corresponding to a second jurisdiction, and wherein the first set of controlling parameters of the first controlling framework comprises at least one controlling parameter different from the second set of controlling parameters of the second controlling framework.

3. The method of claim 2, wherein the signed exchange package is signed using digital signature authenticated using a cryptographic method, and wherein the signed exchange package is further signed based on satisfying a third set of controlling parameters of a central provider of the second jurisdiction, and wherein the escrow wallet system freezes the plurality of funds by restricting exchanges using exchange security restrictions preventing fund disbursement, and wherein the operating account data structure is an exchange ledger that stores funds designated for processing, the operating account data structure maintains a record of deposits, withdrawals, and exchanges.

4. The method of claim 1, wherein processing the controlled release of the funds to the central provider system corresponds to a forfeiture of the funds to a government entity regulating the recipient provider, and wherein processing the controlled release of the funds to the sender provider computing system corresponds to a return of the funds to the sender provider.

5. The method of claim 1, wherein the modeling comprises executing one or more smart contracts comprising executable code to verify compliance of the exchange of funds with the first controlling framework, and wherein the one or more smart contracts automatically generates the exchange flag, embeds the exchange flag into the signed exchange package, and freezes the funds by routing the signed exchange package to the escrow wallet.

6. The method of claim 5, wherein the one or more processing circuits are nodes of a distributed ledger, wherein the one or more processing circuits store the one or more smart contracts on the distributed ledger and execute the one or more smart contracts by verifying compliance with the first controlling framework, updating a compliance status or a compliance result on the distributed ledger.

7. The method of claim 1, wherein the escrow wallet system comprises a plurality of escrow accounts, and wherein routing the signed exchange package to the escrow wallet is further based on a type of exchange flag of a plurality of types of exchange flags, wherein the plurality of types of exchange flags comprise terrorism detection, non-compliant exchange detection, regulatory detection, or office of foreign assets control (OFAC) detection.

8. The method of claim 1, further comprising:

processing, by the one or more processing circuits, one or more interest payments to at least one of the sender provider, the recipient provider, the sender, or the recipient.

9. The method of claim 1, further comprising:

determining, by the one or more processing circuits, a first access location of the plurality of access locations of the one or more data feeds corresponding to the at least one primary data source;

determining, by the one or more processing circuits, a second access location of the plurality of access locations of the one or more data feeds corresponding to the at least one secondary data source, wherein the at least one primary data source comprise jurisdiction-specific data, and the at least one secondary data source comprise jurisdiction-agnostic data; and updating, by the one or more processing circuits, the first controlling framework based on receiving or accessing the additional data from the first access location or the second access location.

10. A system, comprising:

a data processing system comprising memory and one or more processing circuits configured to:

maintain an operating account data structure comprising a plurality of funds of a recipient provider, wherein maintaining the operating account data structure comprises storing the plurality of funds under a first controlling framework corresponding with a first set of controlling parameters;

receive, from a sender provider computing system, a signed exchange package for an exchange of funds between a sender of a sender provider and a recipient of the recipient provider, wherein the signed exchange package is signed based on satisfying a second set of controlling parameters of a second controlling framework of the sender provider;

store the signed exchange package comprising the funds of the signed exchange package into the operating account data structure;

model the signed exchange package using the first controlling framework to generate an exchange flag, wherein the modeling comprises executing one or more smart contracts comprising executable code to verify compliance of the exchange of funds with the first controlling framework, wherein the first set of controlling parameters of the first controlling framework are accessed from one or more data feeds of a plurality of access locations, wherein the exchange flag is generated based on a detection of a discrepancy in the signed exchange package or a regulatory restriction, wherein the one or more data feeds comprise at least one primary API connection to at least one primary data source and at least one second API connection to at least one secondary data source;

embed the exchange flag into the signed exchange package as metadata of the signed exchange package and cryptographically protecting the exchange flag and the metadata;

freeze the funds by routing the signed exchange package comprising the funds and the exchange flag from the operating account data structure to an escrow wallet of an escrow wallet system of the recipient provider;

generate and present a graphical user interface (GUI) dashboard that comprises real-time information regarding a compliance status of the exchange of funds, a location of the funds, and the discrepancy in the signed exchange package or the regulatory restriction, the GUI dashboard further comprising at least one selectable element corresponding to the compliance status;

monitor the funds within the escrow wallet based on receiving or accessing additional data from at least one of the one or more data feeds of the plurality of access locations or the sender provider computing system; and process a controlled release of the funds from the escrow wallet to a wallet system of the recipient, to the sender provider computing system, or a central provider system, wherein the controlled release to the wallet system is based on satisfying the discrepancy in the signed exchange package or the regulatory restriction, and wherein the controlled release to the sender provider computing system or the central provider system is based on a time period of the funds being in the escrow wallet or failing to satisfy the discrepancy in the signed exchange package or the regulatory restriction, and wherein processing the controlled release further comprises determining an interest amount based on a duration the funds were frozen in the escrow wallet, the interest amount to be applied to at least one of the sender provider, the recipient provider, the sender, or the recipient.

11. The system of claim 10, wherein the first controlling framework and the second controlling framework are jurisdiction-specific, the first controlling framework corresponding to a first jurisdiction and the second controlling framework corresponding to a second jurisdiction, and wherein the first set of controlling parameters of the first controlling framework comprises at least one controlling parameter different from the second set of controlling parameters of the second controlling framework.

12. The system of claim 11, wherein the signed exchange package is signed using digital signature authenticated using a cryptographic method, and wherein the signed exchange package is further signed based on satisfying a third set of controlling parameters of a central provider of the second jurisdiction, and wherein the escrow wallet system freezes the plurality of funds by restricting exchanges using exchange security restrictions preventing fund disbursement, and wherein the operating account data structure is an exchange ledger that stores funds designated for processing, the operating account data structure maintains a record of deposits, withdrawals, and exchanges.

13. The system of claim 10, wherein processing the controlled release of the funds to the central provider system corresponds to a forfeiture of the funds to a government entity regulating the recipient provider, and wherein processing the controlled release of the funds to the sender provider computing system corresponds to a return of the funds to the sender provider.

14. The system of claim 10, wherein the modeling comprises executing one or more smart contracts comprising executable code to verify compliance of the exchange of funds with the first controlling framework, and wherein the one or more smart contracts automatically generates the exchange flag, embeds the exchange flag into the signed exchange package, and freezes the funds by routing the signed exchange package to the escrow wallet.

15. The system of claim 10, wherein the escrow wallet system comprises a plurality of escrow accounts, and wherein routing the signed exchange package to the escrow wallet is further based on a type of exchange flag of a plurality of types of exchange flags, wherein the plurality of types of exchange flags comprise terrorism detection, non-compliant exchange detection, regulatory detection, or office of foreign assets control (OFAC) detection.

16. The system of claim 10, wherein the one or more processing circuits further configured to:

in response to processing the controlled release, determine an interest amount based on a duration the funds were frozen in the escrow wallet; and process one or more interest payments to at least one of the sender provider, the recipient provider, the sender, or the recipient.

17. A non-transitory computer readable medium (CRM) comprising one or more instructions stored thereon that, when executed by one or more processing circuits, cause the one or more processing circuits to perform operations comprising:

maintaining an operating account data structure comprising a plurality of funds of a recipient provider, wherein maintaining the operating account data structure comprises storing the plurality of funds under a first controlling framework corresponding with a first set of controlling parameters;

receiving, from a sender provider computing system, a signed exchange package for an exchange of funds between a sender of a sender provider and a recipient of the recipient provider, wherein the signed exchange package is signed based on satisfying a second set of controlling parameters of a second controlling framework of the sender provider;

modeling the signed exchange package using the first controlling framework to generate an exchange flag, wherein the modeling comprises executing one or more smart contracts comprising executable code to verify compliance of the exchange of funds with the first controlling framework, wherein the first set of controlling parameters of the first controlling framework are accessed from one or more data feeds of a plurality of access locations, wherein the exchange flag is generated based on a detection of a discrepancy in the signed exchange package or a regulatory restriction, wherein the one or more data feeds comprise at least one primary API connection to at least one primary data source and at least one second API connection to at least one secondary data source;

routing the signed exchange package comprising the funds and the exchange flag from the operating account data structure to an escrow wallet of an escrow wallet system of the recipient provider;

generating and presenting a graphical user interface (GUI) dashboard that comprises real-time information regarding a compliance status of the exchange of funds, a location of the funds, and the discrepancy in the signed exchange package or the regulatory restriction, the GUI dashboard further comprising at least one selectable element corresponding to the compliance status;

monitoring the funds within the escrow wallet based on receiving or accessing additional data from at least one of the one or more data feeds of the plurality of access locations or the sender provider computing system; and processing a controlled release of the funds from the escrow wallet to a wallet system of the recipient, to the sender provider computing system, or a central provider system, wherein the controlled release to the wallet system is based on satisfying the discrepancy in the signed exchange package or the regulatory restriction, and wherein the controlled release to the sender provider computing system or the central provider system is based on a time period of the funds being in the escrow wallet or failing to satisfy the discrepancy in the signed exchange package or the regulatory restriction, and wherein processing the controlled release further comprises determining an interest amount based on a duration the funds were frozen in the escrow wallet, the interest amount to be applied to at least one of the sender provider, the recipient provider, the sender, or the recipient.

18. The non-transitory CRM of claim 17, wherein the first controlling framework and the second controlling framework are jurisdiction-specific, the first controlling framework corresponding to a first jurisdiction and the second controlling framework corresponding to a second jurisdiction, and wherein the first set of controlling parameters of the first controlling framework comprises at least one controlling parameter different from the second set of controlling parameters of the second controlling framework.

* * * * *